(12) United States Patent
Acosta et al.

(10) Patent No.: US 10,346,279 B2
(45) Date of Patent: Jul. 9, 2019

(54) METHOD FOR OPTIMIZED CANARY DEPLOYMENTS FOR IMPROVED CUSTOMER EXPERIENCE

(71) Applicant: Citrix Systems, Inc., Fort Lauderdale, FL (US)

(72) Inventors: Santiago Acosta, Davie, FL (US); Ashish Gujarathi, Parkland, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 162 days.

(21) Appl. No.: 15/659,285

(22) Filed: Jul. 25, 2017

(65) Prior Publication Data
US 2019/0034315 A1   Jan. 31, 2019

(51) Int. Cl.
G06F 11/34 (2006.01)
G06Q 10/06 (2012.01)
G06F 8/71 (2018.01)
G06F 8/658 (2018.01)

(52) U.S. Cl.
CPC .......... *G06F 11/3466* (2013.01); *G06F 8/658* (2018.02); *G06F 8/71* (2013.01); *G06Q 10/06393* (2013.01)

(58) Field of Classification Search
CPC .............................. G06F 11/34; G06F 11/3466
USPC ....................................................... 714/48
See application file for complete search history.

(56) References Cited

U.S. PATENT DOCUMENTS

| | | | | |
|---|---|---|---|---|
| 9,627,000 | B1* | 4/2017 | Gardner | G11B 27/36 |
| 9,886,261 | B1* | 2/2018 | Hotchkies | G06F 8/65 |
| 2010/0088410 | A1* | 4/2010 | Ridley | H04L 41/0896 709/224 |
| 2012/0266156 | A1* | 10/2012 | Spivak | G06F 9/5055 717/172 |
| 2014/0074510 | A1* | 3/2014 | McClung | G16H 50/30 705/3 |
| 2014/0379901 | A1* | 12/2014 | Tseitlin | H04L 43/08 709/224 |
| 2015/0128121 | A1* | 5/2015 | Garcia | G06F 8/65 717/170 |
| 2017/0046146 | A1* | 2/2017 | Jamjoom | G06F 8/62 |

* cited by examiner

*Primary Examiner* — Kamini B Patel
(74) *Attorney, Agent, or Firm* — Foley & Lardner LLP; Christopher J. McKenna; Shabbi S. Khan

(57) ABSTRACT

Described embodiments may provide deployment of updates to multiple entities. A canary deployment manager may receive a request to deploy an update in canary deployments. The canary deployment manager may determine, for each entity of a plurality of entities, a support score based on support issues experienced by each entity. The canary deployment manager may determine, for each entity, a monitoring score based on at least one performance or availability issue experienced by each entity. The canary deployment manager may generate, for each entity, based on the support score of each entity and the monitoring score of each entity, a canary score used to identify a canary deployment to which to assign each entity. The canary deployment manager may select a subset of the plurality of entities to assign to a first canary wave of the canary deployments based on the respective canary scores of each of the subset.

20 Claims, 6 Drawing Sheets

METHOD FOR OPTIMIZED CANARY DEPLOYMENTS FOR IMPROVED CUSTOMER EXPERIENCE

FIELD OF THE DISCLOSURE

The present application generally relates to distributing updates (e.g., software updates or hardware updates). In particular, the present application relates to systems and methods for deploying updates to multiple entities using canary deployments.

BACKGROUND OF THE DISCLOSURE

Under canary deployment schemes, incremental updates to an application may be tested by deploying a new version of an application side-by-side with a production version of the application to a multitude of clients. A different version of the application may be provided to one subset of clients, whereas a production version of the application may be provided to another subset of clients. In current distribution algorithms, the subset of clients to be provided with the new version of the applications may be picked at random.

BRIEF SUMMARY OF THE DISCLOSURE

The present disclosure is directed towards systems and methods for deploying updates to multiple entities. The updates can include a software update, such as an update to application instances previously deployed or executing on computing devices corresponding to the multiple entities. The update may be an update to provide additional features, remove existing features, add, remove or modify parameter settings, among others. In some embodiments, the updates can include an update to hardware corresponding to devices of the entities.

In canary deployment systems, a new, pilot, or otherwise test version of software, for instance, an application may be provided to one subset of clients, whereas a production version of the application may be provided to another subset of clients. The update may be deployed via a computer network, including a local area network or a wide area network, or via the internet. In some implementations, the update may be deployed via a cloud-based service. As the test version of the application may be distributed to the subset of clients, any adverse impact therefrom may be limited to the subset and any change arising from the test version may be reversed. Each client may have different hardware configurations with varying processing power, memory space, and graphic rendering, among other, capabilities. In addition, each end user at the client (or entity) may have different perceptions of quality of the application running on the client. As such, selecting which entities to provide the test version of the application at random may result in quality perception issues especially with end users that have previously had issues with the application.

To minimize the potential for perceived low quality and any adverse impact from the test version of the application, the present systems and methods provide for an optimal canary deployment distribution model incorporating multiple factors. A canary deployment manager device may use a distribution algorithm with input parameters (e.g., customer support activity, environmental complexity, and customer scale, etc.) in selecting in selecting the clients or entities to distribute the test version of the application. The distribution algorithm may combine multiple input parameters unique to each entity to determine a canary deployment schedule or deployment wave for the test version of the appliance to the clients. These input parameters may include a support score, a monitoring score, a complexity score, and a scale score, among others. The support score may be calculated based on a number of logged customer support issues for the client or entity. The monitoring score may be calculated based on a performance and availability of the client. The complexity score may be calculated based on a complexity of schema or environment of the entity. The scale score may be calculated based on a number of end users in a software tenancy. Using these input parameters, the canary deployment manager device may calculate an overall canary score for each entity.

Based on the overall canary score for each entity, the canary deployment device may assign the entity to one of many canary deployment waves. In canary deployments, updates are deployed in waves such that entities that are assigned to a first wave receive the test version of the application at a first time and entities that are assigned to a second wave receive the test version of the application at a second time. In some embodiments, entities with higher overall canary scores may be assigned to a later deployment wave relative to entities with lower overall canary scores. Entities assigned to earlier wave may receive the test version of the application at an earlier time than entities assigned to the later wave. Rolling out the test version of the application in waves may minimize disruption to the broad set of entities, if there are issues with the new features or functionalities of the test version. In this manner, the canary deployment manager device may achieve a maximum or optimal perceived quality of the application among the end users of the clients receiving the test version of the application.

At least one aspect of this disclosure is directed to a system for deploying updates to multiple entities. A device may include a canary deployment manager. The canary deployment manager may receive a request to deploy an update in a plurality of canary deployments. The canary deployment manager may determine, for each entity of a plurality of entities, a support score based on support issues experienced by each entity. The canary deployment manager may determine, for each entity of the plurality of entities, a monitoring score based on at least one performance or availability issue experienced by each entity. The canary deployment manager may generate, for each entity of the plurality of entities, based on the support score of each entity and the monitoring score of each entity, a canary score used to identify a canary deployment to which to assign each entity. The canary deployment manager may select a subset of the plurality of entities to assign to a first canary wave of the plurality of canary deployments based on the respective canary scores of each of the subset of entities.

In some embodiments, the canary deployment manager may determine, for each entity, a number of customer support issues logged by the entity or a severity level of the customer support issues logged by the entity. In some embodiments, to determine, for each entity of a plurality of entities, the support score based on support issues experienced by each entity, the canary deployment manager may determine, for each entity, the support score based on the number of customer support issues logged by the entity or the severity level of the customer support issues logged by the entity.

In some embodiments, the canary deployment manager may determine, for each entity, a length of time since the support issue was experienced by each entity. In some embodiments, to determine, for each entity of a plurality of entities, the support score based on support issues experienced by each entity, the canary deployment manager may determine, for each entity, the support score based on the length of the time since the support issue was experienced by each entity.

In some embodiments, the canary deployment manager may determine, for each entity, a number of performance degradation issues experienced by the entity that are monitored by the device or a severity level of the performance degradation issues experienced by the entity that are monitored by the device. In some embodiments, to determine, for each entity of the plurality of entities, the monitoring score based on the at least one performance or availability issue experienced by each entity, the canary deployment manager may determine, for each entity, the monitoring score based on the number of performance degradation issues experienced by the entity that are monitored by the device or the severity level of the performance degradation issues experienced by the entity that are monitored by the device.

In some embodiments, the canary deployment manager may determine, for each entity, a length of time since the at least one performance or availability issue was experienced by each entity. In some embodiments, to determine, by the device, for each entity of the plurality of entities, the monitoring score based on the at least one performance or availability issue experienced by each entity, the canary deployment manager may determine, for each entity, the monitoring score based on the length of the time since the at least one performance or availability issue was experienced by each entity.

In some embodiments, the canary deployment manager may determine, for each entity of a plurality of entities, a complexity score determined based on a complexity of a schema or environment of each entity. In some embodiments, to generate, for each entity, the canary score, the canary deployment manager may generate the canary score of each entity based on the complexity score of each entity.

In some embodiments, the canary deployment manager may determine, for each entity of a plurality of entities, a scale score determined based on a number of accounts managed by each entity. In some embodiments, to generate, for each entity, the canary score, the canary deployment manager may generate the canary score of each entity based on the scale score of each entity.

In some embodiments, to determine, for each entity of the plurality of entities, the monitoring score based on at least one performance or availability issue experienced by each entity, a monitor of the device may record the at least one performance or availability issue experienced by each entity. In some embodiments, to select a subset of the plurality of entities to assign to a first canary deployment of the plurality of canary deployments based on the respective canary scores of each of the subset of entities, the canary deployment manager may select each entity of the subset based on i) the respective canary score of each entity relative to a predetermined threshold score or ii) the respective canary score of each entity relative to respective canary scores of a remainder of the plurality of entities.

In some embodiments, the subset of the plurality of entities to assign to a first canary deployment of the plurality of canary deployments may include a first subset. In some embodiments, the canary deployment manager may select a second subset of the plurality of entities to assign to a second canary deployment of the plurality of canary deployments based on the respective canary scores of each of the second subset of entities.

Another aspect of this disclosure is directed to a method of deploying application features to multiple entities. A device may receive a request to deploy an update in a plurality of canary deployments. The device may determine, for each entity of a plurality of entities, a support score based on support issues experienced by each entity. The device may generate, for each entity of the plurality of entities, based on the support score of each entity and the monitoring score of each entity, a canary score used to identify a canary deployment to which to assign each entity. The device may select a subset of the plurality of entities to assign to a first canary deployment of the plurality of canary deployments based on the respective canary scores of each of the subset of entities.

In some embodiments, the device may determine, for each entity, a number of customer support issues logged by the entity or a severity level of the customer support issues logged by the entity. In some embodiments, determining, for each entity of a plurality of entities, the support score based on support issues experienced by each entity may include determining, for each entity, the support score based on the number of customer support issues logged by the entity or the severity level of the customer support issues logged by the entity/

In some embodiments, the device may determine, for each entity, a length of time since the support issue was experienced by each entity. In some embodiments, determining, for each entity of a plurality of entities, the support score based on support issues experienced by each entity may include determining, for each entity, the support score based on the length of the time since the support issue was experienced by each entity.

In some embodiments, the device may determine, for each entity, a length of time since the support issue was experienced by each entity. In some embodiments, determining, for each entity of a plurality of entities, the support score based on support issues experienced by each entity may include determining, for each entity, the support score based on the length of the time since the support issue was experienced by each entity.

In some embodiments, the device may determine, for each entity, a number of performance degradation issues experienced by the entity that are monitored by the device or a severity level of the performance degradation issues experienced by the entity that are monitored by the device. In some embodiments, determining, by the device, for each entity of the plurality of entities, the monitoring score based on the at least one performance or availability issue experienced by each entity may include determining, for each entity, the monitoring score based on the number of performance degradation issues experienced by the entity that are monitored by the device or the severity level of the performance degradation issues experienced by the entity that are monitored by the device.

In some embodiments, the device may determine, for each entity, a length of time since the at least one performance or availability issue was experienced by each entity. In some embodiments, determining, for each entity of the plurality of entities, the monitoring score based on the at least one performance or availability issue experienced by each entity may include determining, for each entity, the monitoring score based on the length of the time since the at least one performance or availability issue was experienced by each entity.

In some embodiments, the device may determine, for each entity of a plurality of entities, a complexity score determined based on a complexity of a schema or environment of each entity. In some embodiments, generating, for each entity, the canary score may include generating the canary score of each entity based on the complexity score of each entity.

In some embodiments, the device may determine, for each entity of a plurality of entities, a scale score determined based on a number of accounts managed by each entity. In some embodiments, generating, for each entity, the canary score may include generating the canary score of each entity based on the scale score of each entity.

In some embodiments, determining, for each entity of the plurality of entities, the monitoring score based on at least one performance or availability issue experienced by each entity may include recording, by a monitor of the device, the at least one performance or availability issue experienced by each entity.

In some embodiments, selecting a subset of the plurality of entities to assign to a first canary deployment of the plurality of canary deployments based on the respective canary scores of each of the subset of entities may include selecting, each entity of the subset based on i) the respective canary score of each entity relative to a predetermined threshold score or ii) the respective canary score of each entity relative to respective canary scores of a remainder of the plurality of entities.

In some embodiments, the subset of the plurality of entities to assign to a first canary deployment of the plurality of canary deployments may include a first subset. In some embodiments, the device may select a second subset of the plurality of entities to assign to a second canary deployment of the plurality of canary deployments based on the respective canary scores of each of the second subset of entities

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
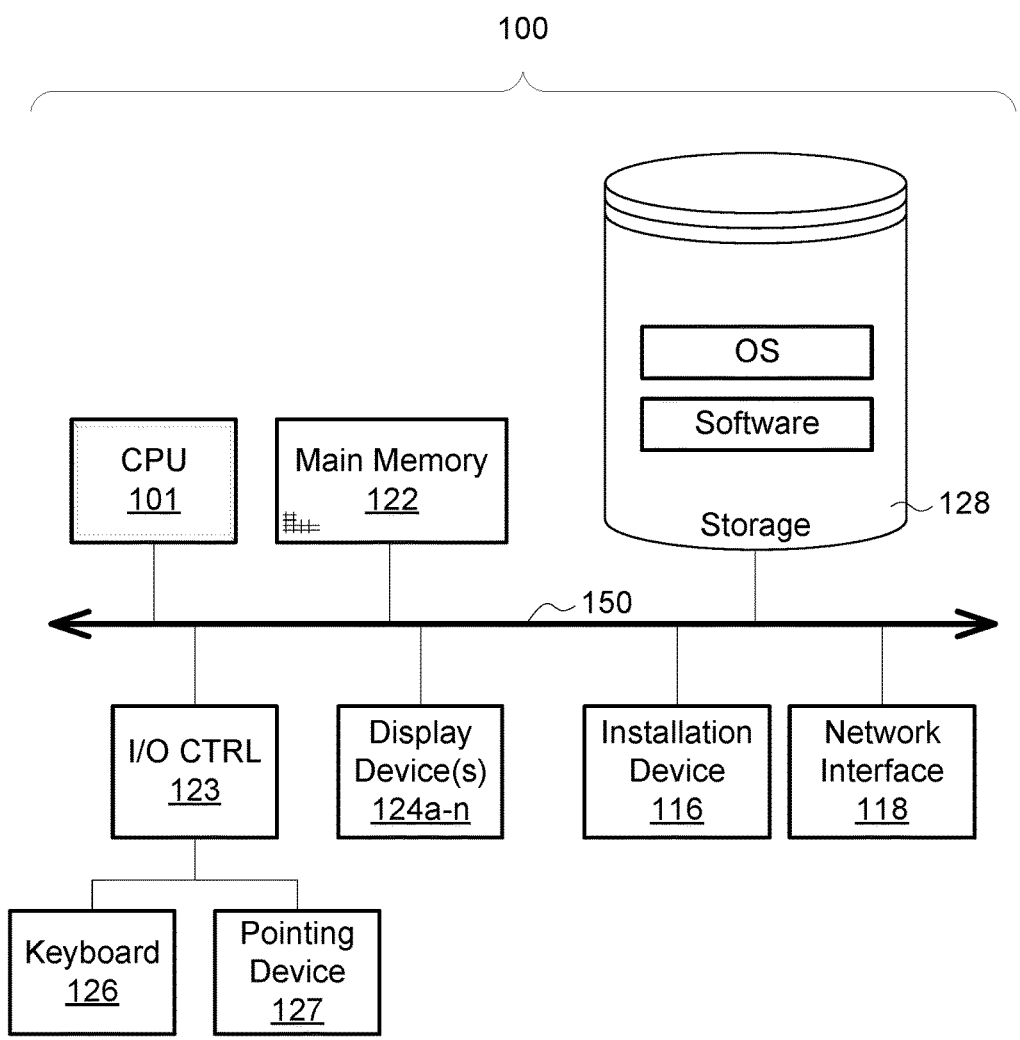
FIGS. 1A-1D are block diagrams of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for deploying updates to multiple entities.

A. Computing Environment

Figure 1B:
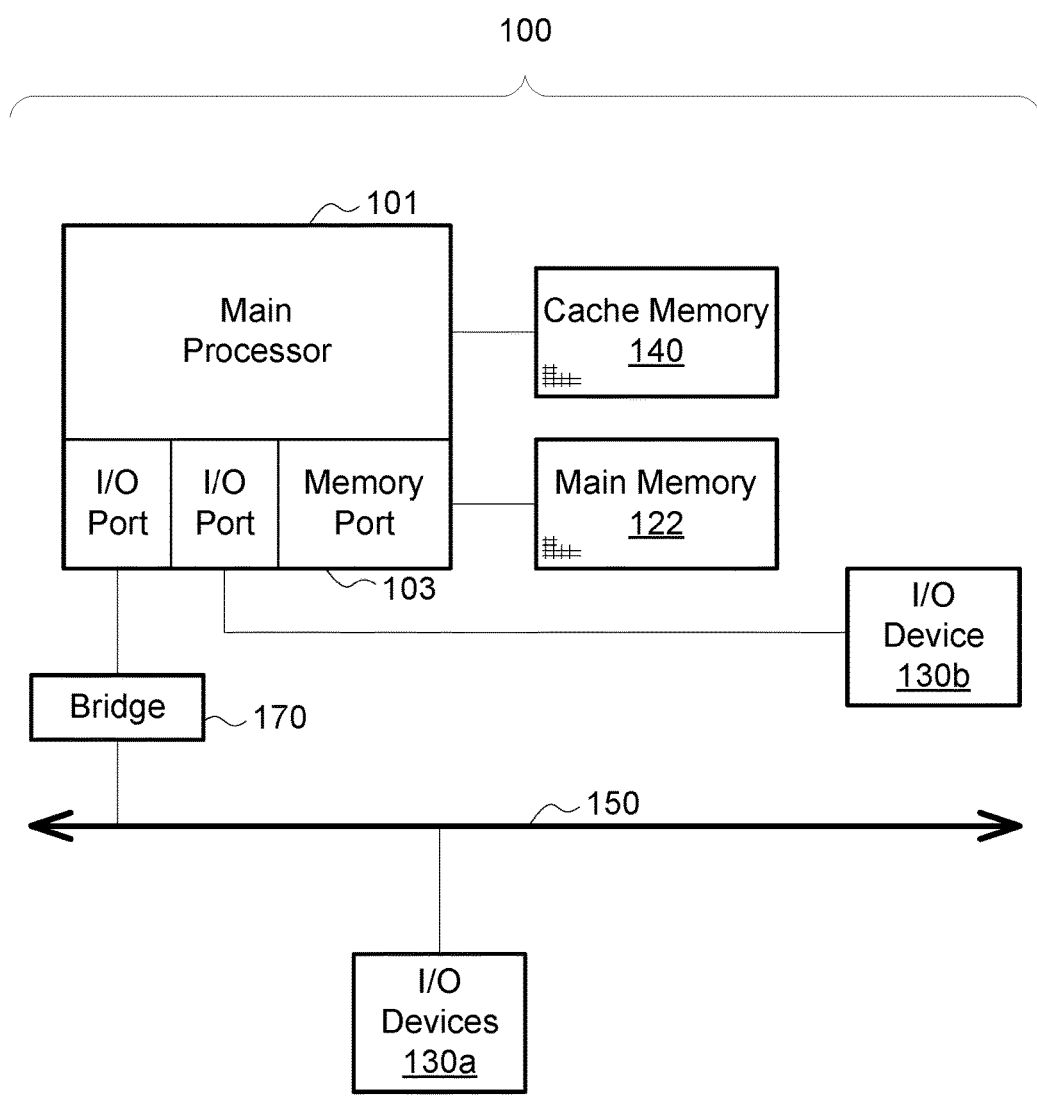

Prior to discussing the specifics of embodiments of the systems and methods of an appliance and/or client, it may be helpful to discuss the computing environments in which such embodiments may be deployed. FIGS. 1A and 1B depict block diagrams of a computing device 100 useful for practicing embodiments of the systems and devices described further below in Section B. As shown in FIGS. 1A and 1B, each computing device 100 includes a central processing unit 101, and a main memory unit 122. As shown in FIG. 1A, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Samsung Electronics of Suwon, Korea; those manufactured by Micron Technology of Boise, Id.; those manufactured by Transmeta Corporation of Santa Clara, Calif.; those manufactured by International Business Machines of White Plains, N.Y.; or those manufactured by Advanced Micro Devices of Sunnyvale, Calif., among others. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1A, the processor 101 communicates with main memory 122 via a system bus 150 (described in more detail below). FIG. 1B depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1B, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1B depicts an embodiment of a computer 100 in which the main processor 101 communicates directly with I/O device 130b via HyperTransport, Rapid I/O, or InfiniBand. FIG. 1B also depicts an embodiment in which local busses and direct communication are mixed: the processor 101 communicates with I/O device 130b using a local interconnect bus while communicating with I/O device 130a directly.

The computing device 100 may support any suitable installation device 116, such as a CD-ROM drive, a CD-R/RW drive, a DVD-ROM drive, tape drives of various formats, USB device, hard-drive or any other device suitable for installing software and programs. The computing device 100 may further comprise a storage device 128, such as one or more hard disk drives or redundant arrays of independent disks, for storing an operating system and other related software, and for storing application software programs. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1A. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif. or SanDisk Corporation of Milpitas, Califronia.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1A and 1B typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, and WINDOWS 10, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a UNIX operating system, among others.

In other embodiments, the computing device 100 may have different processors, operating systems, and input devices consistent with the device. For example, in one embodiment the computer 100 may be a smartphone or a tablet, such as those developed by Apple Inc., by Samsung Electronics, by Xiaomi. Inc., or by Google Inc., among others. In this embodiment, the smartphone or tablet may be operated under the control of an operating system (such as Android or iOS) and may include a stylus input device as well as a touch sensitive screen. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1C:
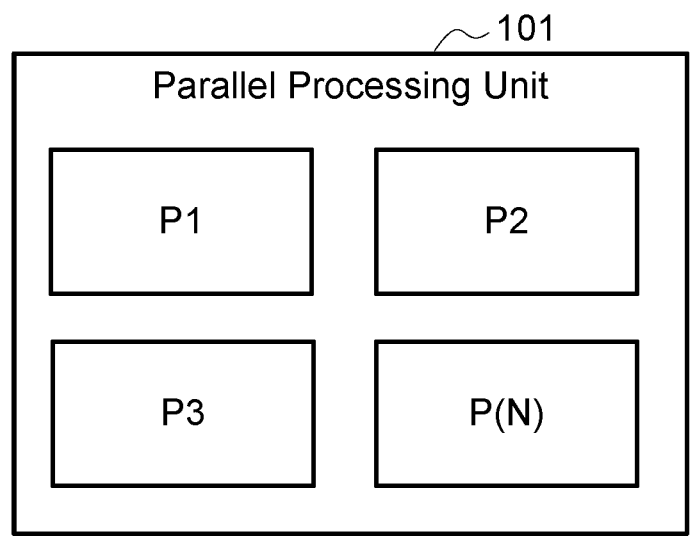

As shown in FIG. 1C, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a Cell Broadband Engine architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1D:
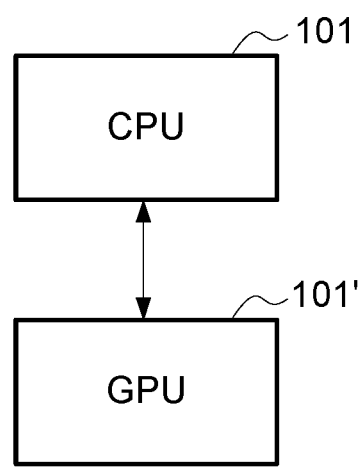

In some embodiments, the computing device 100 may comprise a graphics processing unit. In one of these embodiments depicted in FIG. 1D, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Deploying Updates to Multiple Entities

The present disclosure is directed towards systems and methods for deploying updates to multiple entities. The updates can include a software update, such as an update to application instances previously deployed or executing on computing devices corresponding to the multiple entities. The update may be an update to provide additional features, remove existing features, add, remove or modify parameter settings, among others. In some embodiments, the updates can include an update to hardware corresponding to devices of the entities.

In canary deployment systems, a new, pilot, or otherwise test version of software, for instance, an application may be provided to one subset of clients, whereas a production version of the application may be provided to another subset of clients. The update may be deployed via a computer network, including a local area network or a wide area network, or via the internet. In some implementations, the update may be deployed via a cloud-based service. As the test version of the application may be distributed to the subset of clients, any adverse impact therefrom may be limited to the subset and any change arising from the test version may be reversed. Each client may have different hardware configurations with varying processing power, memory space, and graphic rendering, among other, capabilities. In addition, each end user at the client (or entity) may have different perceptions of quality of the application running on the client. As such, selecting which entities to provide the test version of the application at random may result in quality perception issues especially with end users that have previously had issues with the application.

To minimize the potential for perceived low quality and any adverse impact from the test version of the application, the present systems and methods provide for an optimal canary deployment distribution model incorporating multiple factors. A canary deployment manager device may use a distribution algorithm with input parameters (e.g., customer support activity, environmental complexity, and customer scale, etc.) in selecting in selecting the clients or entities to distribute the test version of the application. The distribution algorithm may combine multiple input parameters unique to each entity to determine a canary deployment schedule or deployment wave for the test version of the appliance to the clients. These input parameters may include a support score, a monitoring score, a complexity score, and a scale score, among others. The support score may be calculated based on a number of logged customer support issues for the client or entity. The monitoring score may be calculated based on a performance and availability of the client. The complexity score may be calculated based on a complexity of schema or environment of the entity. The scale score may be calculated based on a number of end users in a software tenancy. Using these input parameters, the canary deployment manager device may calculate an overall canary score for each entity.

Based on the overall canary score for each entity, the canary deployment device may assign the entity to one of many canary deployment waves. In canary deployments, updates are deployed in waves such that entities that are assigned to a first wave receive the test version of the application at a first time and entities that are assigned to a second wave receive the test version of the application at a second time. In some embodiments, entities with higher the overall canary scores may be assigned to a later wave deployment in receiving the test version of the application. On the other hand, entities with lower the overall canary scores may be assigned to an earlier wave deployment in receiving the test version of the application. Entities assigned to the earlier wave deployment may receive the test version of the application at an earlier time than entities assigned to the later wave. Rolling out the test version of the application in waves may minimize disruption to the broad set of entities, if there are issues with the new features or functionalities of the test version. In this manner, the canary deployment manager device may achieve a maximum or optimal perceived quality of the application among the end users of the clients receiving the test version of the application.

Figure 2:
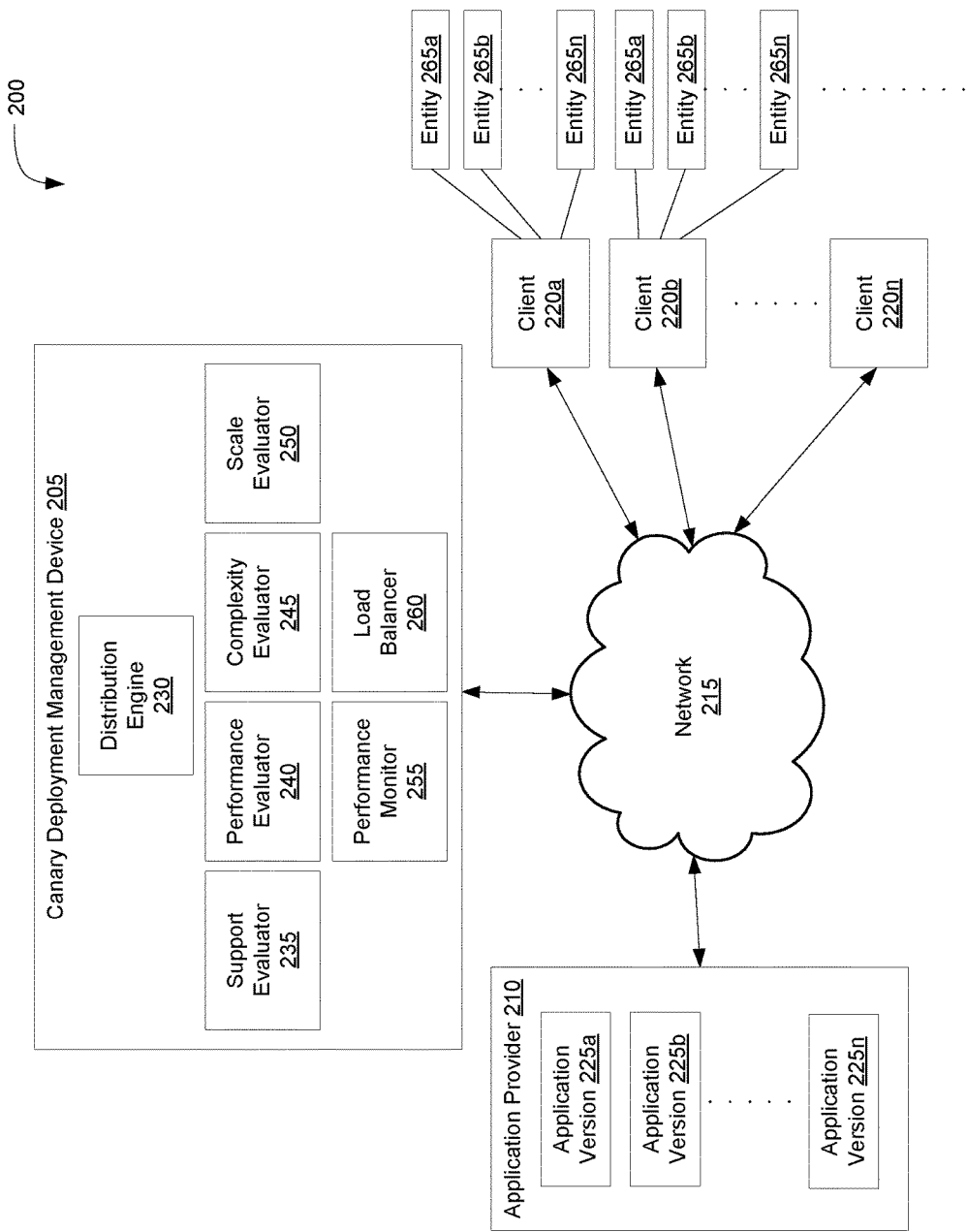
FIG. 2 is a block diagram of an embodiment of a system for deploying updates to multiple entities.

Referring now to FIG. 2, depicted is a block diagram of an embodiment of a system 200 for deploying updates to multiple entities. In brief summary, the system 200 may include a canary deployment management device 205, an application provider 210, and one or more clients 220a-n. The canary deployment management device 205, the application provider 210, and the one or more clients 220a-n may be communicatively coupled or connected to another (e.g., via a network 215). The application provider 210 may be a cloud-based service that, via the canary deployment management device 205, deploy updates or cause updates to be deployed to application instances to the one or more clients 220a-n via the cloud or one or more other networks.

The canary deployment management device 205 may include a distribution engine 230, a support evaluator 235, a performance evaluator 240, a complexity evaluator 245, a scale evaluator 250, a performance monitor 255, and a load balancer 260 among others. In some embodiments, the distribution engine 230, the support evaluator 235, the performance evaluator 240, the complexity evaluator 245, the scale evaluator 250, the performance monitor 255, and the load balancer 260 may be part of a canary deployment manager. The application provider 210 may include or store one or more application versions 225a-n. Each client 220a-n may be associated with one or more entities 265a-n (e.g., users).

Each of the above-mentioned elements or entities is implemented in hardware, or a combination of hardware and software, in one or more embodiments. Each component of the system 200 may be implemented using hardware or a combination of hardware or software detailed above in connection with FIGS. 1A-1D. For instance, each of these elements or entities can include any application, program, library, script, task, service, process or any type and form of executable instructions executing on hardware of the canary deployment management device 205, the application provider 210, and the one or more clients 220a-n. The hardware includes circuitry such as one or more processors in one or more embodiments.

In further detail, the application provider 210 may store or otherwise include one or more versions 225a-n of an application. In some embodiments, the application provider 210 may include a database for storing the one or more application versions 225a-n. Each application version 225a-n may correspond to a software, an instruction, or otherwise computer-readable executable code for execution at the one or more clients 220a-n. In some embodiments, each client 220a-n may have some version 225a-n of the application installed. Each application version 225a-n may correspond to an identifier, such as a version name or identifier. Each application version 225a-n may correspond to a later or newer version of the application. In some embodiments, each application version 225a-n may correspond to a production version of the application. In some embodiments, each application version 225a-n may correspond to a test or pilot version of the application. Each application version 225a-n may include functionalities or features different from other application versions 225a-n. For example, a test version of the application may include new features lacking in a production version of the application.

In rolling out a version of the application 225a-n to the entities 265a-n, the application provider 210 may send a request to deploy an update in a plurality of canary deployments. The distribution engine 230 may in turn receive the request to deploy the update in a plurality of canary deployments. In some embodiments, the request to deploy the update may be from a device different from the application provider 210. The request to deploy the update may include an identifier corresponding to the application version 225a-n. In some embodiments, the request to deploy the update may include a time stamp corresponding to sending of the request. In some embodiments, the request to deploy the update may specify a number of canary deployments. In some embodiments, the request to deploy the update may include one or more constraints for each canary deployment, such as geographical region of the client 220a-n or entity 265a-n, system configuration of the client 220a-n, and attributes of the entity 265a-n, among others. In some embodiments, the request to deploy the update may include identifiers for a subset of entities 265a-n to include into the plurality of canary developments.

The plurality of canary deployments determined by the distribution engine 230 may specify or may define a time (e.g., a specific time or time window) at which to provide the application version 225a-n for each entity 265a-n or client 220a-n. Each canary deployment may identify or may include a set of entities 265a-n or a set of client 220a-n at the times at which to provide the application version 225a-n. Each entity 265a-n may correspond to an account of an end user of the client 220a-n. The account of the end user of the client 220a-n may be authorized, permitted, or licensed to use one of the application versions 225a-n provided by the application provider 210. Each entity 265a-n may be identified by an account identifier associated with an end user of the client 220a-n. In some embodiments, an entity 265a-n may be associated with multiple clients 220a-n (e.g., logged onto multiple clients 220a-n simultaneously or one at a time). In some embodiments, one or more entities 265a-n may be part of a tenancy for using the application versions 225a-n. Details regarding how the various components of the canary deployment management device 205 may assign each entity 265a-n or client 220a-n to a canary deployment are explained below.

Having received the request to deploy the update from the application provider 210 (or some other device), the distribution engine 230 may generate, determine, or calculate a canary score for each entity 265a-n. The canary score may be used to identify a canary deployment to which to assign each entity 265a-n. The canary score may be any numerical value (e.g., ranging from 0 to 100, 0 to 10, 0 to 1, −100 to 100, −10 to 10, or −1 to 1, etc.) used to identify which canary deployment to which to assign each entity 265a-n. The distribution engine 230 may generate the canary score for each entity 265a-n using any number of input parameters, such as a support score, a monitoring score, a complexity score, and a scale score, among others. The support score may be determined by the support evaluator 235. The monitoring score may be determined by the performance evaluator 240. The complexity score may be determined by the complexity evaluator 245. The scale score may be determined by the scale evaluator 250.

The support evaluator 235 may determine the support score for each entity 265a-n based on support issues experienced by the entity 265a-n. The support score may indicate a frequency or a rate at which the entity 265a-n submits a customer support request or issue. In some embodiments, the support score may indicate a number of times the entity 265a-n submits a customer support request or issue. The frequency, rate, or number may signify or may serve as a proxy measure of the quality of experience that the entity 265a-n faces in operation the application provided by the application provider 210. The support score may be any numerical value (e.g., ranging from 0 to 100, 0 to 10, 0 to 1, −100 to 100, −10 to 10, or −1 to 1, etc.) measuring the quality of experience indicated by each entity 265a-n. The support score for one entity 265a-n may be weighted or scaled by the support scores of other entities 265a-n.

To determine the support score, the support evaluator 235 may determine or identify any factors related to customer support issues indicated by each entity 265a-n. In some embodiments, the support evaluator 235 may determine or identify a number of customer support issues logged or submitted by the entity 265a-n. The number of customer support issues logged by the entity 265a-n may be maintained or stored at a customer support database. The customer support database may be a part of the canary deployment management device 205, a part of the application provider 210, or otherwise be accessible by the support evaluator 235. The support evaluator 235 may determine or identify a length of time since the customer support issue was experienced or logged by the entity 265a-n. The length of time may be measured from a current time to a time of the most recent customer support issue. The support evaluator 235 may determine or identify a frequency of time of the customer support issues logged by the entity 265a-n. The support evaluator 235 may determine or identify a severity level of the customer support issues logged or submitted by the entity 265a-n. The severity level may be any numerical value (e.g., ranging from 0 to 100, 0 to 10, 0 to 1, −100 to 100, −10 to 10, or −1 to 1, etc.) indicating a degree of the quality of experience faced by the entity 265a-n. The severity level of the customer support issues logged by the entity 265a-n may be maintained or stored at the customer support database. Based on the factors related to customer support issues indicated by each entity 265a-n, the support evaluator 235 may determine or calculate the support score for the entity 265a-n.

In some embodiments, the support evaluator 235 may determine the support score based on the number of customer support issues logged by the entity 265a-n. In some embodiments, the support evaluator 235 may scale the number of customer support issues logged by the entity 265a-n with the number of customer support issues logged by other entities 265a-n to calculate the support score. In some embodiments, the higher the number of customer support issues, the higher the support score determined by the support evaluator 235 may be. In contrast, the lower the number of customer support issues, the lower the support score determined by the support evaluator 235 may be. In some embodiments, the support evaluator 235 may identify the highest number of customer support issues logged by all the entities 265a-n. Having identified the highest number of customer support issues, the support evaluator 235 may scale the number of customer support issues for each entity 265a-n by the highest number of customer support issues 265a-n to calculate the support score. In some embodiments, the support score may be weighted or scaled by the length of time since the customer support issue was logged by the entity 265a-n. In some embodiments, the support score may be weighted or scaled by the frequency of the customer support issues logged by the entity 265a-n. In some embodiments, the support score may be weighted or scaled by the several level of the customer support issues logged by the entity 265a-n.

In some embodiments, the support evaluator 235 may determine the support score based on the severity level of the customer support issues logged by each entity 265a-n. In some embodiments, the greater the severity level, the higher the support score determined by the support evaluator 235 may be. In contrast, the lesser the severity level, the lower the support score determined by the support evaluator 235 may be. In some embodiments, the support evaluator 235 may scale the severity level of the customer support issues logged by the entity 265a-n with the severity level of customer support issues logged by other entities 265a-n to calculate the support score. In some embodiments, the support evaluator 235 may calculate a sum of the severity levels of all of the customer support issues logged by each entity 265a-n. In some embodiments, the support evaluator 235 may identify the highest sum of severity levels among the entities 265a-n. Having identified the highest sum of severity levels of customer support issues logged by all the entities 265a-n, the support evaluator 235 may scale the severity level of customer support issues for each entity 265a-n by the highest sum of severity levels of customer support issues 265a-n to calculate the support score. In some embodiments, the support score may be weighted or scaled by the length of time since the customer support issue was logged by the entity 265a-n. In some embodiments, the support score may be weighted or scaled by the frequency of the customer support issues logged by the entity 265a-n. In some embodiments, the support score may be weighted or scaled by the number of customer support issues logged by the entity 265a-n.

In some embodiments, the support evaluator 235 may determine the support score based on the length of time since the customer support issue was logged by the entity 265a-n. In some embodiments, the longer the length of time, the higher the support score determined by the support evaluator 235 may be. In contrast, the short the length of time, the lower the support score determined by the support evaluator 235 may be. In some embodiments, the support evaluator 235 may scale the length of time since the customer support issue was logged by the entity 265a-n with the length of time since the customer support issue was logged by the entities 265a-n to calculate the support score. In some embodiments, the support evaluator 235 may identify the longest length of time since the customer support issue was logged by any of the entities 265a-n. Having identified the longest length of time, the support evaluator 235 may scale the length of time since the customer support issue was logged by each entity 265a-n by the identified longest length of time to calculate the support score. In some embodiments, the support score may be weighted or scaled by the number of the customer support issues logged by the entity 265a-n. In some embodiments, the support score may be weighted or scaled by the frequency of the customer support issues logged by the entity 265a-n. In some embodiments, the support score may be weighted or scaled by the several level of the customer support issues logged by the entity 265a-n.

In some embodiments, the support evaluator 235 may determine the support score based on the frequency of the customer support issues logged by the entity 265a-n. In some embodiments, the support evaluator 235 may scale the frequency of the customer support issues logged by the entity 265a-n with the frequencies of the customer support issues logged by other entities 265a-n to calculate the support score. In some embodiments, the support evaluator 235 may identify the greatest frequency of customer support issues logged by any of the entities 265*a-n*. Having identified the greatest frequency, the support evaluator 235 may scale the frequency of customer support issues logged by each entity 265*a-n* by the identified greater frequency to calculate the support score. In some embodiments, the support score may be weighted or scaled by the number of the customer support issues logged by the entity 265*a-n*. In some embodiments, the support score may be weighted or scaled by the several level of the customer support issues logged by the entity 265*a-n*.

The performance evaluator 240 may determine the monitoring score for each entity 265*a-n* based on the performance and/or availability issue experienced by each entity 265*a-n*. The monitoring score may indicate the performance and availability of the client 220*a-n* that the entity 265*a-n* may be using (e.g., to use or operate an application). The performance and availability may be related to consumption of computing resources, memory, power consumption, latency, response time, and network bandwidth, among other metrics, of the client 220*a-n* used by the entity 265*a-n*. The monitoring score may be any numerical value (e.g., ranging from 0 to 100, 0 to 10, 0 to 1, −100 to 100, −10 to 10, or −1 to 1, etc.) measuring the performance of the client 220*a-n* used by the entity 265*a-n*. The monitoring score for one client 220*a-n* used by one entity 265*a-n* may be weighted or scaled by the monitoring scores of the other clients 220*a-n* used by the respective entities 265*a-n*.

To determine the monitoring score, the performance evaluator 240 may determine or identify any factors related to performance degradation or availability issues experienced by each entity 265*a-n* and monitored by the performance monitor 255. The performance monitor 255 may detect performance or availability issues experienced by each entity 265*a-n* at the respective client 220*a-n*. The performance monitor 255 may measure a device performance metric of the client 220*a-n* used by the entity 265*a-n*. The device performance metric may include a processing time (measured in seconds or minutes), memory consumption (measured in percentage or amount), a response time (measured in seconds or minutes), network bandwidth consumption (measured in percentage or amount), and network latency (measured in seconds or minutes), among others. The performance monitor 255 may compare the device performance metric to a predefined threshold. The predefined threshold may signify or indicate a level of performance degradation at which the entity 265*a-n* using the client 220*a-n* may face a noticeable degradation in quality of experience. In some embodiments, the predefined threshold may vary for different times of device metrics (e.g., a threshold time for processing time and a percentage threshold for memory consumption). If the measured device performance metric is less than the predefined threshold, the performance monitor 255 may determine that the client 220*a-n* used by the entity 265*a-n* is not undergoing a performance or availability issue. If the measured device performance metric is greater than the predefined threshold, the performance monitor 255 may determine that the client 220*a-n* used by the client 265*a-n* is undergoing a performance or availability issue. In some embodiments, the performance monitor 255 may store or maintain the detected performance or availability issues per client 220*a-n* in a performance tracking database.

To calculate the monitoring score, in some embodiments, the performance evaluator 240 may determine or identify a number of performance degradation issues experienced by the entity 265*a-n*. The performance degradation issues experienced by the entity 265*a-n* may be those detected by the performance monitor 255 using the techniques described above. The number of performance degradation issues experienced by the entity 265*a-n* may be maintained or stored at the performance tracking database. The performance tracking database may be a part of the canary deployment management device 205, a part of the application provider 210, or otherwise be accessible by the performance evaluator 240. The performance evaluator 240 may determine or identify a length of time since the performance degradation or availability issue was experienced by the entity 265*a-n*. The length of time may be measured from a current time to a time of the most recent detection of the performance degradation. The performance evaluator 240 may determine or identify a frequency of time of the performance degradation issues experienced by the entity 265*a-n*.

The performance evaluator 240 in conjunction with the performance monitor 255 may determine or identify a severity level of the performance degradation issues experienced by the entity 265*a-n*. The severity level may be any numerical value (e.g., ranging from 0 to 100, 0 to 10, 0 to 1, −100 to 100, −10 to 10, or −1 to 1, etc.) indicating a degree of the quality of experience faced by the entity 265*a-n*. The severity level of the performance degradation issues experienced by the entity 265*a-n* may be maintained or stored at the performance tracking database. In some embodiments, the performance monitor 255 may compare the measured device performance metric to ranges of severity levels. The ranges of severity levels may specify a mapping of the measured device performance metric to a severity level (e.g., a numerical value mapping). Upon identifying one of the ranges, the performance monitor 255 may determine the severity level corresponding to the measured device performance metric. Based on the factors related to performance degradation issues experienced by each entity 265*a-n*, the performance evaluator 240 may determine or calculate the monitoring score for the entity 265*a-n*.

In some embodiments, the performance evaluator 240 may determine the monitoring score based on the number of performance degradation issues experienced by the entity 265*a-n*. The performance degradation issues experienced by the entity 265*a-n* may be those detected by the performance monitor 255 using the techniques described above. In some embodiments, the performance evaluator 240 may scale the number of performance degradation issues experienced by the entity 265*a-n* with the number of performance degradation issues experienced by other entities 265*a-n* to calculate the monitoring score. In some embodiments, the performance evaluator 240 may identify the highest number of performance degradation issues experienced by all the entities 265*a-n*. Having identified the highest number of performance degradation issues, the performance evaluator 240 may scale the number of performance degradation issues for each entity 265*a-n* by the highest number of performance degradation issues 265*a-n* to calculate the monitoring score. In some embodiments, the monitoring score may be weighted or scaled by the length of time since the performance or availability issue was experienced by the entity 265*a-n*. In some embodiments, the monitoring score may be weighted or scaled by the frequency of the performance degradation issues experienced by the entity 265*a-n*. In some embodiments, the monitoring score may be weighted or scaled by the several level of the performance degradation issues experienced by the entity 265*a-n*.

In some embodiments, the performance evaluator 240 may determine the monitoring score based on the severity level of the performance degradation issues experienced by each entity 265a-n. The performance degradation issues experienced by the entity 265a-n may be those detected by the performance monitor 255 using the techniques described above. In some embodiments, the performance evaluator 240 may scale the severity level of the performance degradation issues experienced by the entity 265a-n with the severity level of performance degradation issues experienced by other entities 265a-n to calculate the monitoring score. In some embodiments, the performance evaluator 240 may calculate a sum of the severity levels of all of the performance degradation issues experienced by each entity 265a-n. In some embodiments, the performance evaluator 240 may identify the highest sum of severity levels among the entities 265a-n. Having identified the highest sum of severity levels of performance degradation issues experienced by all the entities 265a-n, the performance evaluator 240 may scale the severity level of performance degradation issues for each entity 265a-n by the highest sum of severity levels of performance degradation issues 265a-n to calculate the monitoring score. In some embodiments, the monitoring score may be weighted or scaled by the length of time since the performance or availability issue was experienced by the entity 265a-n. In some embodiments, the monitoring score may be weighted or scaled by the frequency of the performance degradation issues experienced by the entity 265a-n. In some embodiments, the monitoring score may be weighted or scaled by the number of performance degradation issues experienced by the entity 265a-n.

In some embodiments, the performance evaluator 240 may determine the monitoring score based on the length of time since the performance or availability issue was experienced by the entity 265a-n. The performance degradation issues experienced by the entity 265a-n may be those detected by the performance monitor 255 using the techniques described above. In some embodiments, the performance evaluator 240 may scale the length of time since the performance or availability issue was experienced by the entity 265a-n with the length of time since the performance or availability issue was experienced by the entities 265a-n to calculate the monitoring score. In some embodiments, the performance evaluator 240 may identify the longest length of time since the performance or availability issue was experienced by any of the entities 265a-n. Having identified the longest length of time, the performance evaluator 240 may scale the length of time since the performance or availability issue was experienced by each entity 265a-n by the identified longest length of time to calculate the monitoring score. In some embodiments, the monitoring score may be weighted or scaled by the number of the performance degradation issues experienced by the entity 265a-n. In some embodiments, the monitoring score may be weighted or scaled by the frequency of the performance degradation issues experienced by the entity 265a-n. In some embodiments, the monitoring score may be weighted or scaled by the several level of the performance degradation issues experienced by the entity 265a-n.

In some embodiments, the performance evaluator 240 may determine the monitoring score based on the frequency of the performance degradation issues experienced by the entity 265a-n. In some embodiments, the performance evaluator 240 may scale the frequency of the performance degradation issues experienced by the entity 265a-n with the frequencies of the performance degradation issues experienced by other entities 265a-n to calculate the monitoring score. In some embodiments, the performance evaluator 240 may identify the greatest frequency of performance degradation issues experienced by any of the entities 265a-n. Having identified the greatest frequency, the performance evaluator 240 may scale the frequency of performance degradation issues experienced by each entity 265a-n by the identified greater frequency to calculate the monitoring score. In some embodiments, the monitoring score may be weighted or scaled by the number of the performance degradation issues experienced by the entity 265a-n. In some embodiments, the monitoring score may be weighted or scaled by the several level of the performance degradation issues experienced by the entity 265a-n.

The complexity evaluator 245 may determine the complexity score for each entity 265a-n based on a complexity of schema or an environment of each entity 265a-n. The complexity score for the scheme or the environment may be indicative of an amount of data or a magnitude of a database schema accessed by the client 220a-n used by the entity 265a-n. In some embodiments, the greater the magnitude of complexity, the higher the complexity score determined by the complexity evaluator 245 may be. In contrast, the lesser the magnitude of complexity, the lower the complexity score determined by the complexity evaluator 245 may be. The database schema may define how elements (e.g., tables, fields, indexes, packages, functions, triggers, queues, sequences, dictionaries, relationships, etc.) in the database are related to one another. The complexity score may be any numerical value (e.g., ranging from 0 to 100, 0 to 10, 0 to 1, −100 to 100, −10 to 10, or −1 to 1, etc.) measuring the complexity of the database schema accessed by the client 220a-n used by the entity 265a-n. In some embodiments, the complexity score may be particular to some version of the application 225a-n executed on the client 220a-n used by the entity 265a-n. The complexity score for one client 220a-n used by one entity 265a-n may be weighted or scaled by the complexity scores of the other clients 220a-n used by the respective entities 265a-n.

To determine the complexity score, the complexity evaluator 245 may determine or identify any factors related to the complexity of the database schema accessed by the client 220a-n used by the entity 265a-n. In some embodiments, the complexity evaluator 245 may identify a number of elements in the database schema accessed by the client 220a-n. In some embodiments, the complexity evaluator 245 may identify a number of relationships or mappings among the elements in the database schema accessed by the client 220a-n. In some embodiments, the complexity evaluator 245 may identify a number of databases in the database schema accessed by the client 220a-n. In some embodiments, the complexity evaluator 245 may identify a model of the database (e.g., hierarchical, network, relational, etc.). Based on the number of elements, the number of relations or mappings, the number of databases, the model of the database, among other factors, the complexity evaluator 245 may calculate the complexity score for the client 220a-n used by the entity 265a-n.

In some embodiments, the complexity evaluator 245 may scale the complexity score for the client 220a-n used by the entity 265a-n. In some embodiments, the complexity evaluator 245 may scale the complexity score for one client 220a-n based on the complexity scores of all the clients 220a-n used by the entities 265a-n. In some embodiments, the complexity evaluator 245 may identify the highest complexity score from the complexity scores of all the clients 220a-n used by the entities 265a-n. Having identified highest complexity score, the complexity evaluator 245 may scale each complexity score for each client 220a-n used by the entity 265a-n with the highest complexity score.

The scale evaluator 250 may determine the scale score for each entity 265a-n based on a number of accounts associated with each entity 265a-n. In some embodiments, the scale score may be indicative of a number of tenants for the application versions 225a-n provided by the application provider 210. In some embodiments, the greater the number of tenants, the higher the scale score determined by the scale evaluator 250 may be. In contrast, the lesser the number of tenants, the lower the scale score determined by the scale evaluator 250 may be. The scale score may be any numerical value (e.g., ranging from 0 to 100, 0 to 10, 0 to 1, −100 to 100, −10 to 10, or −1 to 1, etc.) measuring the complexity of the database schema accessed by the client 220a-n used by the entity 265a-n. In some embodiments, the scale score may be particular to some version of the application 225a-n executed on the client 220a-n used by the entity 265a-n. The scale score for one client 220a-n used by one entity 265a-n may be weighted or scaled by the scale scores of the other clients 220a-n used by the respective entities 265a-n.

To determine the scale score, the scale evaluator 250 may determine or identify any factors related to the number of accounts associated with each entity 265a-n or the number of tenants for the applications provided by the application provider 210. In some embodiments, the scale evaluator 250 may identify the number of accounts associated with each entity 265a-n. In some embodiments, the scale evaluator 250 may identify a number of account identifiers used by each entity 265a-n. The account identifiers may be maintained at a user account database. The user account database may be a part of the canary deployment management device 205, a part of the application provider 210, or otherwise accessible to the scale evaluator 250. In some embodiments, the scale evaluator 250 may access the user account database to identify the number of account identifiers to determine the number of accounts associated with each entity 265a-n. In some embodiments, the scale evaluator 250 may identify the number of tenants for the application version 225a-n provided to the entities 265a-n. In some embodiments, the scale evaluator 250 may identify a number of tenant identifiers for the application version 225a-n associated with the entities 265a-n. The tenant identifiers may be maintained at the user account database. The scale evaluator 250 may access the user account database to identify the number of tenant identifiers to determine the number of tenants provided with the application versions 225a-n by the application version 210. Based on the number of accounts associated with each entity 265a-n and/or the number of tenants for the applications provided by the application provider 210, the scale evaluator 250 may calculate the scale score for the entity 265a-n.

In some embodiments, the scale evaluator 250 may scale the scale score for the entity 265a-n. In some embodiments, the scale evaluator 250 may scale the scale score for one entity 265a-n on the scale scores of all the entities 265a-n. In some embodiments, the scale evaluator 250 may identify the highest scale score from the scale scores of all the entities 265a-n. Having identified highest scale score, the scale evaluator 250 may scale each scale score for each client 220a-n used by the entity 265a-n with the highest scale score.

With the input parameters for the canary score for each entity 265a-n determined, the distribution engine 230 may select subsets of the entities 265a-n may to assign to canary waves of the plurality of canary deployments based on the overall canary score for each entity 265a-n. Responsive to determining all the input parameters, the distribution engine 230 may determine the overall canary score for each entity 265a-n. To calculate the overall canary score, the distribution engine 230 may calculate a combination value of the input parameters. The combination value may be a sum, an average, a weighted average, a function, or any other amalgamation of the input parameters. Once the overall canary scores are calculated for all of the entities 265a-n, the distribution engine 230 may select the subsets of entities 265a-n to assign to canary waves of the plurality of canary deployments. As described above, the plurality of canary deployments determined by the distribution engine 230 may specify or may define a time (e.g., a specific time or time window) at which to provide the application version 225a-n for each entity 265a-n or client 220a-n. The plurality of canary deployments may correspond to a canary wave. Each canary wave may identify or may include a set of entities 265a-n or a set of client 220a-n at the time at which to provide the application version 225a-n. In some embodiments, the plurality of canary deployments may include a subset of entities 265a-n identified in the request to deploy the update. In some embodiments, the plurality of canary deployments may include a subset of entities 265a-n satisfying the one or more constraints specified in the request to deploy the update.

To select the subsets of entities 265a-n to assign to canary waves, the distribution engine 230 may select each entity 265a-n of the subset for each canary wave based on the respective canary score relative to the canary scores other entities 265a-n. In some embodiments, the distribution engine 230 may select the entity 265a-n for the subset in the canary wave based on the respective canary score the entity 265a-n relative to predetermined threshold score. If the overall canary score is greater than or equal to the predetermined threshold score, the distribution engine 230 may set the entity 265a-n to the respective subset (e.g., a first canary wave). If the overall canary score is less than the predetermined threshold score, the distribution engine 230 may set the entity 265a-n to the other respective subset (e.g., a second canary wave).

The distribution engine 230 may assign the entities 265a-n to the respective canary waves based on the overall canary scores of each entity 265a-n. In some embodiments, the distribution engine 230 may select the entity 265a-n for the subset in the canary wave based on the respective canary score the entity 265a-n based on a canary wave mapping. The canary wave mapping may specify a range of overall canary scores for each canary wave of the plurality of canary deployments (e.g., 0 to 0.4 for a first canary wave, 0.4 to 0.9 for a second canary wave, and 0.9 to 1.0 for a third canary wave). The distribution engine 230 may compare the overall canary score of each entity 265a-n to the ranges specified in the canary wave mapping. Upon identifying a matching range, the distribution engine 230 may assign the entity 265a-n to the canary wave corresponding to the matching range of the canary wave mapping.

With the entities 265a-n assigned to canary waves of the plurality of canary deployments, the load balancer 260 may send, transmit, relay, or otherwise provide the application version 225a-n to the entities 265a-n in accordance with the plurality of canary deployments. The load balancer 260 may identify the application version 225a-n from the request to deploy the update. In some embodiments, the load balancer 260 may identify a version identifier of the application 225a-n to be provided in the request to deploy the update. The load balancer 260 may determine whether the version identifier of the application 225a-n to be provided is different (e.g., earlier, older, later, more recent, or newer, etc.) than the version identifier the application 225a-n previously provided. If the version identifier of the application 225a-n to be provided does not differ from the version identifier of the application 225a-n previously provided, the load balancer 260 may terminate provision of the application version 225a-n to the entities 265a-n.

On the other hand, if the version identifier of the application 225a-n to be provided differs from the version identifier of the application 225a-n previously provided, the load balancer 260 may proceed to provide the application version 225a-n to the entities 265a-n in accordance with the plurality of canary deployments. The load balancer 260 may retrieve, obtain, or otherwise receive the application version 225a-n from the application provider 210. In some embodiments, the load balancer 260 may send a request for the application using the version identifier for the application version 225a-n to the application provider 210. Subsequently, the load balancer 260 may receive the application version 225a-n from the application provider 210. The load balancer 260 may in turn provide the application version 225a-n in accordance with the plurality of canary deployments. In this fashion, the different, newer features and functionalities of the application version 225a-n may be tested among a subset of entities 265a-n with lower canary scores and thus less indicated performance issues or experiences, prior to rolling out the application 225a-n to the remainder of the entities 265a-n.

To distribute the application version 225a-n in accordance with the plurality of canary deployments, the load balancer 260 may identify the entities 265a-n specified in each canary deployment of the plurality of canary deployments. The load balancer 260 may further identify the times at which to provide the application 225a-n to provide to the subset of entities 265a-n specified in each canary deployment. The load balancer 260 may maintain a time to compare a current time to the time specified for each canary wave. Upon determining a match between the current and the time specified for each canary wave, the load balancer 260 may provide the application version 225a-n to the subset of clients 220a-n used by the associated subset of entities 265a-n specified in the canary wave. In some embodiments, the load balancer 260 may otherwise make available the application version 225a-n to the subset of entities 265a-n specified in the canary wave. In some embodiments, the load balancer 260 may permit the account associated with the subset of entities 265a-n to use the application version 225a-n specified in the request to deploy the update. In some embodiments, the load balancer 260 may monitor network bandwidth usage of the network 215 via which to provide the application 225a-n. By measuring the network bandwidth usage, the load balancer 260 may control distribution of the application version 225a-n.

During the provisioning of the application version 225a-n, the distribution engine 230 may receive a request to stop the deployment of the update. The request to stop the deployment may be from the application provider 210 or another associated device. In some embodiments, the request to stop the deployment of the update may be received by the distribution engine 230, in response to a detection of an adverse experience of the application version 225a-n indicated by the subset of entities 265a-n from at least one of the canary deployments. Upon receipt of the request to stop the deployment, the distribution engine 230 in conjunction with the load balancer 260 may halt or terminate the provisioning of the application version 225a-n to the entities 265a-n for the subsequent canary waves in the plurality of canary deployments. In some embodiments, the distribution engine 230 may also identify the application version 225a-n previously provided to the entities 265a-n. The distribution engine 230 in conjunction with the load balancer 260 may then provide the application version 225a-n previously provided to the one or more subsets of entities 265a-n that were provided with the subsequent application version 225a-n. In this manner, the canary deployment management device 205 may prevent adverse impact and experience from affecting all the entities 265a-n using the applications provided by the application provider 210.

In some embodiments, the distribution engine 230 may continue to keep track of the overall canary scores for each entity 265a-n that were provided with the application version 225a-n. The distribution engine 230 may compare the overall canary scores for each entity 265a-n to a predetermined threshold. The distribution engine 230 may identify a number of the entities 265a-n with overall canary scores greater than or equal to the predetermined threshold. The distribution engine 230 may compare the number of entities 265a-n to a predetermined threshold number. If the number of entities 265a-n is greater than or equal to the predetermined threshold number, the distribution engine 230 in conjunction with the load balancer 260 may halt or terminate the provisioning of the application version 225a-n to the entities 265a-n for the subsequent canary waves in the plurality of canary deployments. In some embodiments, the distribution engine 230 in conjunction with the load balancer 260 may then provide the application version 225a-n previously provided to the one or more subsets of entities 265a-n that were provided with the subsequent application version 225a-n. In this manner, the canary deployment management device 205 may automatically prevent adverse impact and experience from affecting all the entities 265a-n using the applications provided by the application provider 210, without the request to stop the deployment update from the application provider 210.

Figure 3:
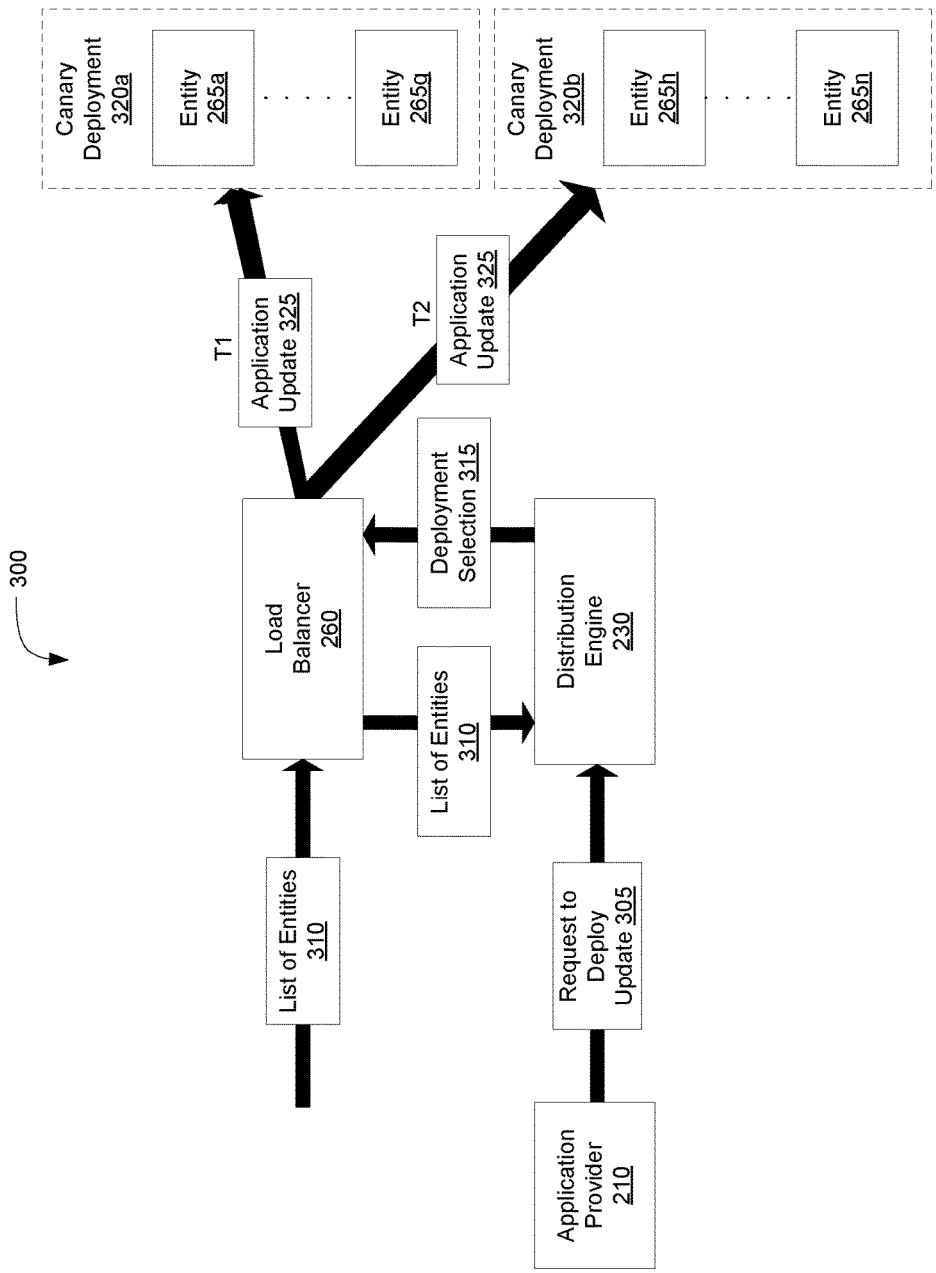
FIG. 3 is a sequence diagram of an embodiment for a system for deploying updates to multiple entities.

Referring now to FIG. 3, depicted is a sequence diagram of an embodiment for a system 300 for deploying updates to multiple entities. Each component of the system 300 may be implemented using hardware or a combination of hardware or software detailed above in connection with FIGS. 1A-1D and FIG. 2. For instance, each of these elements or entities can include any application, program, library, script, task, service, process or any type and form of executable instructions executing on hardware of the application provider 210, the distribution engine 230, the load balancer 260, and the one or more clients 220a-n associated with each of the entities 265a-n. The hardware includes circuitry such as one or more processors in one or more embodiments.

The application provider 210 may send a request to deploy an update 305 to the distribution engine 230 of the canary deployment management device 205. The request to deploy the update 305 may coincide with an updated version of the application 225a-n to be provided by the application provider 210 to various entities 265a-n. In conjunction, the distribution engine 230 may retrieve a list of entities 310 via the load balancer 260. The list of entities 310 may include an identifier for each entity 265a-n to be provided with an updated version of the application 225a-n. In some embodiments, the list of entities 310 may include a list of tenants in a software multitenancy arrangement between the application provider 210 and the entities 265a-n.

The distribution engine 230 in turn may determine an overall canary score for each entity 265a-n included in the list of entities 310. The distribution engine 230 may use any number of input parameters to calculate the overall canary score for each entity 265a-n, such as a support score based on support issues logged by the entity 265a-n, a monitoring score based on performance of the client 220a-n used by the entity 265a-n, the complexity score of the client 220a-n used by the entity 265a-n, and the scale score of the client 220a-n used by the entity 265a-n, among others. With the overall canary score determined for each entity 265a-n, the distribution engine 230 may assign each entity 265a-n to one of many canary deployments 320a-n as specified in a deployment selection 315.

The deployment selection 315 may define which entities 265a-n is assigned to which of the plurality of canary deployment 320a-n. The deployment selection 315 may specify a time at which the application version 225a-n is to be provided to the entities 265a-n assigned to one of the canary deployments 320a-n. In the example depicted in FIG. 3, the entities 265a-g may be assigned to a first canary deployment 320a (sometimes referred to "blue deployment") and the entities 265h-n may be assigned to a second canary deployment 320b (sometimes referred to as "green deployment"). The entities 265a-g in the first canary deployment 320a may receive the application version 225a-n, prior to the entities 265h-n in the second canary deployment 320b.

With the deployment selection 315 set by the distribution engine 230, the load balancer 260 may provide an application update 325 to the clients 220a-n used by the entities 265a-n in accordance to the deployment selection 315. The application update 325 may include the application version 225a-n, and may be configured to be installed at each client 220a-n used by one or more entities 265a-n. In the example depicted in FIG. 3, at time 1 (T1), the load balancer 260 may provide the application update 325 to the first canary deployment 320a in accordance with the deployment selection 315. Subsequently, at time 2 (T2), the load balancer 260 may provide the application update 325 to the second canary deployment 320b also in accordance with the deployment selection 315. In this manner, if there are any adverse effects from providing the application update 325 to the entities 265a-g assigned to the first canary deployment 320a, such adverse effects may be rectified, prevented, or detected prior to providing the application update 325 to the entities 265h-n assigned to the second canary deployment 320b. The determination of the overall canary scores may allow the canary deployment management device 205 to roll out the application update 325 to those entities 265a-n least likely to experience or undergo performance issues with the application versions 225a-n provided by the application provider 210.

Figure 4:
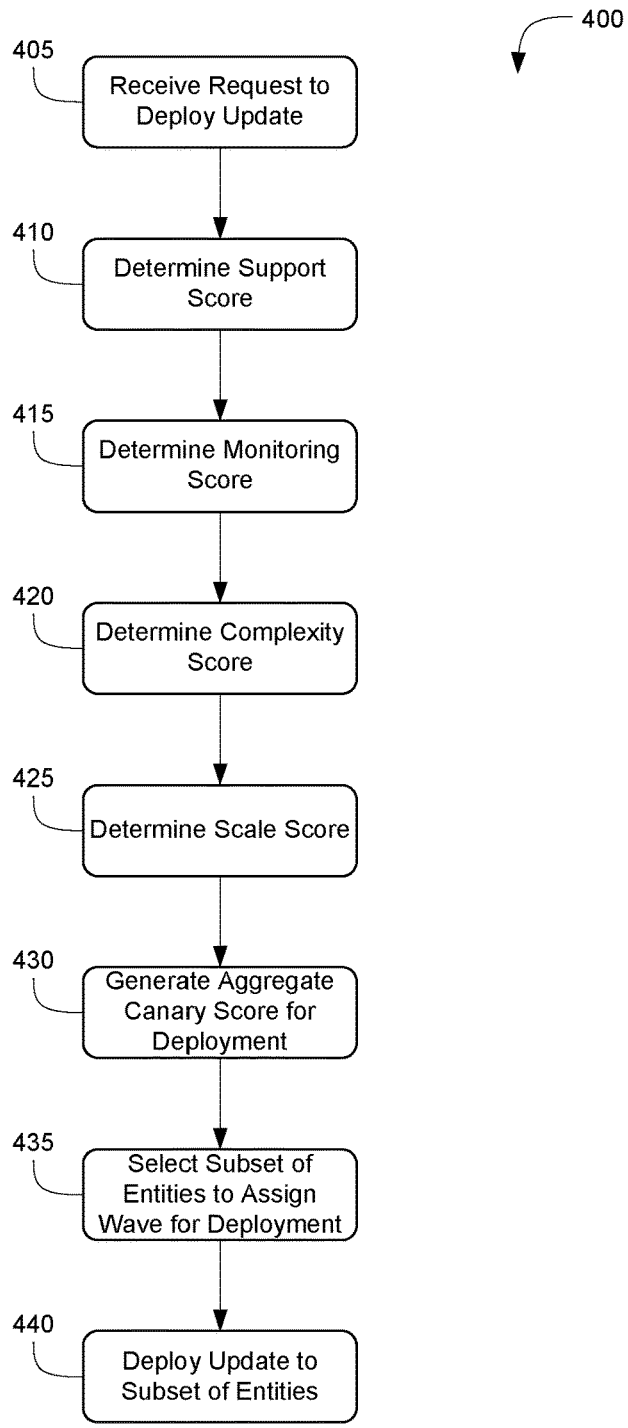
FIG. 4 is a flow diagram of an embodiment of a method for deploying updates to multiple entities.

Referring now to FIG. 4 depicted is a flow diagram of an embodiment of a method 400 for deploying updates to multiple entities. The operations and functionalities of the method 400 may be performed by the system 200 and/or the system 300 detailed above. In brief overview, a canary deployment manager may receive a request to deploy an update (405). The canary deployment manager may determine a support score (410). The canary deployment manager may determine a monitoring score (415). The canary deployment manager may determine a complexity score (420). The canary deployment manager may determine a scale score (425). The canary deployment manager may generate an aggregate canary score for deployment (430). The canary deployment manager may select a subset of entities to assign to a canary wave for deployment (435). The canary deployment manager may deploy update to subset of entities in accordance with the canary wave assignments (440).

In further detail, the canary deployment manager may receive a request to deploy an update (405). In rolling out a version of the application to the entities, the application provider may send a request to deploy an update in a plurality of canary deployments. The application provider may store or otherwise include one or more versions of an application. In some embodiments, the application provider may include a database for storing the one or more application versions. Each application version may correspond to a software, an instruction, or otherwise computer-readable executable code for execution at the one or more clients. In some embodiments, each client may have some version of the application installed. Each application version may correspond to an identifier, such as a version name or identifier. Each application version may correspond to a later or newer version of the application. In some embodiments, each application version may correspond to a production version of the application. In some embodiments, each application version may correspond to a test or pilot version of the application. Each application version may include functionalities or features different from other application versions. For example, a test version of the application may include new features lacking in a production version of the application.

The canary deployment manager may in turn receive the request to deploy the update in a plurality of canary deployments. In some embodiments, the request to deploy the update may be from a device different from the application provider. The request to deploy the update may include an identifier corresponding to the application version. In some embodiments, the request to deploy the update may include a time stamp corresponding to sending of the request. In some embodiments, the request to deploy the update may specify a number of canary deployments. In some embodiments, the request to deploy the update may include one or more constraints for each canary deployment, such as geographical region of the client or entity, system configuration of the client, and attributes of the entity, among others. In some embodiments, the request to deploy the update may include identifiers for a subset of entities to include into the plurality of canary developments.

The plurality of canary deployments determined by the canary deployment manager may specify or may define a time (e.g., a specific time or time window) at which to provide the application version for each entity or client. Each canary deployment may identify or may include a set of entities or a set of client at the times at which to provide the application version. Each entity may correspond to an account of an end user of the client. The account of the end user of the client may be authorized, permitted, or licensed to use one of the application versions provide by the application provider. Each entity may be identified by an account identifier associated with an end user of the client. In some embodiments, an entity may be associated with multiple clients (e.g., logged onto multiple clients simultaneously or one at a time). In some embodiments, one or entities may be part of a tenancy for using the application versions. Details regarding how the various components of the canary deployment management device may assign each entity or client to a canary deployment are explained below.

Having received the request to deploy the update from the application provider (or some other device), the canary deployment manager may generate, determine, or calculate a canary score for each entity. The canary score may be used to identify a canary deployment to which to assign each entity. The canary score may be any numerical value (e.g., ranging from 0 to 100, 0 to 10, 0 to 1, −100 to 100, −10 to 10, or −1 to 1, etc.) used to identify which canary deployment to which to assign each entity. The canary deployment manager may generate the canary score for each entity using any number of input parameters, such as a support score, a monitoring score, a complexity score, and a scale score, among others.

The canary deployment manager may determine a support score (410). The canary deployment manager may determine the support score for each entity based on support issues experienced by the entity. The support score may indicate a frequency or a rate at which the entity submits a customer support request or issue. In some embodiments, the support score may indicate a number of times the entity 265a-n submits a customer support request or issue. The frequency, rate, or number may signify or may serve as a proxy measure of the quality of experience that the entity faces in operation the application provided by the application provider. The support score may be any numerical value (e.g., ranging from 0 to 100, 0 to 10, 0 to 1, −100 to 100, −10 to 10, or −1 to 1, etc.) measuring the quality of experience indicated by each entity. The support score for one entity may be weighted or scaled by the support scores of other entities.

To determine the support score, the canary deployment manager may determine or identify any factors related to customer support issues indicated by each entity. In some embodiments, the canary deployment manager may determine or identify a number of customer support issues logged or submitted by the entity. The number of customer support issues logged by the entity may be maintained or stored at a customer support database. The customer support database may be a part of the canary deployment management device, a part of the application provider, or otherwise be accessible by the canary deployment manager. The canary deployment manager may determine or identify a length of time since the customer support issue was experienced or logged by the entity. The length of time may be measured from a current time to a time of the most recent customer support issue. The canary deployment manager may determine or identify a frequency of time of the customer support issues logged by the entity. The canary deployment manager may determine or identify a severity level of the customer support issues logged or submitted by the entity. The severity level may be any numerical value (e.g., ranging from 0 to 100, 0 to 10, 0 to 1, −100 to 100, −10 to 10, or −1 to 1, etc.) indicating a degree of the quality of experience faced by the entity. The severity level of the customer support issues logged by the entity may be maintained or stored at the customer support database. Based on the factors related to customer support issues indicated by each entity, the canary deployment manager may determine or calculate the support score for the entity.

In some embodiments, the canary deployment manager may determine the support score based on the number of customer support issues logged by the entity. In some embodiments, the canary deployment manager may scale the number of customer support issues logged by the entity with the number of customer support issues logged by other entities to calculate the support score. In some embodiments, the higher the number of customer support issues, the higher the support score determined by the canary deployment manager may be. In contrast, the lower the number of customer support issues, the lower the support score determined by the canary deployment manager may be. In some embodiments, the canary deployment manager may identify the highest number of customer support issues logged by all the entities. Having identified the highest number of customer support issues, the canary deployment manager may scale the number of customer support issues for each entity by the highest number of customer support issues to calculate the support score. In some embodiments, the support score may be weighted or scaled by the length of time since the customer support issue was logged by the entity. In some embodiments, the support score may be weighted or scaled by the frequency of the customer support issues logged by the entity. In some embodiments, the support score may be weighted or scaled by the several level of the customer support issues logged by the entity.

In some embodiments, the canary deployment manager may determine the support score based on the severity level of the customer support issues logged by each entity. In some embodiments, the greater the severity level, the higher the support score determined by the canary deployment manager may be. In contrast, the lesser the severity level, the lower the support score determined by the canary deployment manager may be. In some embodiments, the canary deployment manager may scale the severity level of the customer support issues logged by the entity with the severity level of customer support issues logged by other entities to calculate the support score. In some embodiments, the canary deployment manager may calculate a sum of the severity levels of all of the customer support issues logged by each entity. In some embodiments, the canary deployment manager may identify the highest sum of severity levels among the entities. Having identified the highest sum of severity levels of customer support issues logged by all the entities, the canary deployment manager may scale the severity level of customer support issues for each entity by the highest sum of severity levels of customer support issues to calculate the support score. In some embodiments, the support score may be weighted or scaled by the length of time since the customer support issue was logged by the entity. In some embodiments, the support score may be weighted or scaled by the frequency of the customer support issues logged by the entity. In some embodiments, the support score may be weighted or scaled by the number of customer support issues logged by the entity.

In some embodiments, the canary deployment manager may determine the support score based on the length of time since the customer support issue was logged by the entity. In some embodiments, the longer the length of time, the higher the support score determined by the canary deployment manager may be. In contrast, the short the length of time, the lower the support score determined by the canary deployment manager may be. In some embodiments, the canary deployment manager may scale the length of time since the customer support issue was logged by the entity with the length of time since the customer support issue was logged by the entities to calculate the support score. In some embodiments, the canary deployment manager may identify the longest length of time since the customer support issue was logged by any of the entities. Having identified the longest length of time, the canary deployment manager may scale the length of time since the customer support issue was logged by each entity by the identified longest length of time to calculate the support score. In some embodiments, the support score may be weighted or scaled by the number of the customer support issues logged by the entity. In some embodiments, the support score may be weighted or scaled by the frequency of the customer support issues logged by the entity. In some embodiments, the support score may be weighted or scaled by the several level of the customer support issues logged by the entity.

In some embodiments, the canary deployment manager may determine the support score based on the frequency of the customer support issues logged by the entity. In some embodiments, the canary deployment manager may scale the frequency of the customer support issues logged by the entity with the frequencies of the customer support issues logged by other entities to calculate the support score. In some embodiments, the canary deployment manager may identify the greatest frequency of customer support issues logged by any of the entities. Having identified the greatest frequency, the canary deployment manager may scale the frequency of customer support issues logged by each entity by the identified greater frequency to calculate the support score. In some embodiments, the support score may be weighted or scaled by the number of the customer support issues logged by the entity. In some embodiments, the support score may be weighted or scaled by the several level of the customer support issues logged by the entity.

The canary deployment manager may determine a monitoring score (415). The canary deployment manager may determine the monitoring score for each entity based on the performance and/or availability issue experienced by each entity. The monitoring score may indicate the performance and availability of the client that the entity may be using (e.g., to use or operate an application). The performance and availability may be related to consumption of computing resources, memory, power consumption, latency, response time, and network bandwidth, among other metrics, of the client used by the entity. The monitoring score may be any numerical value (e.g., ranging from 0 to 100, 0 to 10, 0 to 1, −100 to 100, −10 to 10, or −1 to 1, etc.) measuring the performance of the client used by the entity. The monitoring score for one client used by one entity may be weighted or scaled by the monitoring scores of the other clients used by the respective entities.

To determine the monitoring score, the canary deployment manager may determine or identify any factors related to performance degradation or availability issues experienced by each entity and monitored by the monitor. The monitor may detect performance or availability issues experienced by each entity at the respective client. The monitor may measure a device performance metric of the client used by the entity. The device performance metric may include a processing time (measured in seconds or minutes), memory consumption (measured in percentage or amount), a response time (measured in seconds or minutes), network bandwidth consumption (measured in percentage or amount), and network latency (measured in seconds or minutes), among others. The monitor may compare the device performance metric to a predefined threshold. The predefined threshold may signify or indicate a level of performance degradation at which the entity using the client may face a noticeable degradation in quality of experience. In some embodiments, the predefined threshold may vary for different times of device metrics (e.g., a threshold time for processing time and a percentage threshold for memory consumption). If the measured device performance metric is less than the predefined threshold, the monitor may determine that the client used by the entity is not undergoing a performance or availability issue. If the measured device performance metric is greater than the predefined threshold, the monitor may determine that the client used by the client is undergoing a performance or availability issue. In some embodiments, the monitor may store or maintain the detected performance or availability issues per client in a performance tracking database.

To calculate the monitoring score, in some embodiments, the canary deployment manager may determine or identify a number of performance degradation issues experienced by the entity. The performance degradation issues experienced by the entity may be those detected by the monitor using the techniques described above. The number of performance degradation issues experienced by the entity may be maintained or stored at the performance tracking database. The performance tracking database may be a part of the canary deployment management device, a part of the application provider, or otherwise be accessible by the canary deployment manager. The canary deployment manager may determine or identify a length of time since the performance degradation or availability issue was experienced by the entity. The length of time may be measured from a current time to a time of the most recent detection of the performance degradation. The canary deployment manager may determine or identify a frequency of time of the performance degradation issues experienced by the entity.

The canary deployment manager in conjunction with the monitor may determine or identify a severity level of the performance degradation issues experienced by the entity. The severity level may be any numerical value (e.g., ranging from 0 to 100, 0 to 10, 0 to 1, −100 to 100, −10 to 10, or −1 to 1, etc.) indicating a degree of the quality of experience faced by the entity. The severity level of the performance degradation issues experienced by the entity may be maintained or stored at the performance tracking database. In some embodiments, the monitor may compare the measured device performance metric to ranges of severity levels. The ranges of severity levels may specify a mapping of the measured device performance metric to a severity level (e.g., a numerical value mapping). Upon identifying one of the ranges, the monitor may determine the severity level corresponding to the measured device performance metric. Based on the factors related to performance degradation issues experienced by each entity, the canary deployment manager may determine or calculate the monitoring score for the entity.

In some embodiments, the canary deployment manager may determine the monitoring score based on the number of performance degradation issues experienced by the entity. The performance degradation issues experienced by the entity may be those detected by the monitor using the techniques described above. In some embodiments, the canary deployment manager may scale the number of performance degradation issues experienced by the entity with the number of performance degradation issues experienced by other entities to calculate the monitoring score. In some embodiments, the canary deployment manager may identify the highest number of performance degradation issues experienced by all the entities. Having identified the highest number of performance degradation issues, the canary deployment manager may scale the number of performance degradation issues for each entity by the highest number of performance degradation issues to calculate the monitoring score. In some embodiments, the monitoring score may be weighted or scaled by the length of time since the performance or availability issue was experienced by the entity. In some embodiments, the monitoring score may be weighted or scaled by the frequency of the performance degradation issues experienced by the entity. In some embodiments, the monitoring score may be weighted or scaled by the several level of the performance degradation issues experienced by the entity.

In some embodiments, the canary deployment manager may determine the monitoring score based on the severity level of the performance degradation issues experienced by each entity. The performance degradation issues experienced by the entity may be those detected by the monitor using the techniques described above. In some embodiments, the canary deployment manager may scale the severity level of the performance degradation issues experienced by the entity with the severity level of performance degradation issues experienced by other entities to calculate the monitoring score. In some embodiments, the canary deployment manager may calculate a sum of the severity levels of all of the performance degradation issues experienced by each entity. In some embodiments, the canary deployment manager may identify the highest sum of severity levels among the entities. Having identified the highest sum of severity levels of performance degradation issues experienced by all the entities, the canary deployment manager may scale the severity level of performance degradation issues for each entity by the highest sum of severity levels of performance degradation issues to calculate the monitoring score. In some embodiments, the monitoring score may be weighted or scaled by the length of time since the performance or availability issue was experienced by the entity. In some embodiments, the monitoring score may be weighted or scaled by the frequency of the performance degradation issues experienced by the entity. In some embodiments, the monitoring score may be weighted or scaled by the number of performance degradation issues experienced by the entity.

In some embodiments, the canary deployment manager may determine the monitoring score based on the length of time since the performance or availability issue was experienced by the entity. The performance degradation issues experienced by the entity may be those detected by the monitor using the techniques described above. In some embodiments, the canary deployment manager may scale the length of time since the performance or availability issue was experienced by the entity with the length of time since the performance or availability issue was experienced by the entities to calculate the monitoring score. In some embodiments, the canary deployment manager may identify the longest length of time since the performance or availability issue was experienced by any of the entities. Having identified the longest length of time, the canary deployment manager may scale the length of time since the performance or availability issue was experienced by each entity by the identified longest length of time to calculate the monitoring score. In some embodiments, the monitoring score may be weighted or scaled by the number of the performance degradation issues experienced by the entity. In some embodiments, the monitoring score may be weighted or scaled by the frequency of the performance degradation issues experienced by the entity. In some embodiments, the monitoring score may be weighted or scaled by the several level of the performance degradation issues experienced by the entity.

In some embodiments, the canary deployment manager may determine the monitoring score based on the frequency of the performance degradation issues experienced by the entity. In some embodiments, the canary deployment manager may scale the frequency of the performance degradation issues experienced by the entity with the frequencies of the performance degradation issues experienced by other entities to calculate the monitoring score. In some embodiments, the canary deployment manager may identify the greatest frequency of performance degradation issues experienced by any of the entities. Having identified the greatest frequency, the canary deployment manager may scale the frequency of performance degradation issues experienced by each entity by the identified greater frequency to calculate the monitoring score. In some embodiments, the monitoring score may be weighted or scaled by the number of the performance degradation issues experienced by the entity. In some embodiments, the monitoring score may be weighted or scaled by the several level of the performance degradation issues experienced by the entity.

The canary deployment manager may determine a complexity score (420). The canary deployment manager may determine the complexity score for each entity based on a complexity of schema or an environment of each entity. The complexity score for the scheme or the environment may be indicative of an amount of data or a magnitude of a database schema accessed by the client used by the entity. In some embodiments, the greater the magnitude of complexity, the higher the complexity score determined by the canary deployment manager may be. In contrast, the lesser the magnitude of complexity, the lower the complexity score determined by the canary deployment manager may be. The database schema may define how elements (e.g., tables, fields, indexes, packages, functions, triggers, queues, sequences, dictionaries, relationships, etc.) in the database are related to one another. The complexity score may be any numerical value (e.g., ranging from 0 to 100, 0 to 10, 0 to 1, −100 to 100, −10 to 10, or −1 to 1, etc.) measuring the complexity of the database schema accessed by the client used by the entity. In some embodiments, the complexity score may be particular to some version of the application executed on the client used by the entity. The complexity score for one client used by one entity may be weighted or scaled by the complexity scores of the other clients used by the respective entities.

To determine the complexity score, the canary deployment manager may determine or identify any factors related to the complexity of the database schema accessed by the client used by the entity. In some embodiments, the canary deployment manager may identify a number of elements in the database schema accessed by the client. In some embodiments, the canary deployment manager may identify a number of relationships or mappings among the elements in the database schema accessed by the client. In some embodiments, the canary deployment manager may identify a number of databases in the database schema accessed by the client. In some embodiments, the canary deployment manager may identify a model of the database (e.g., hierarchical, network, relational, etc.). Based on the number of elements, the number of relations or mappings, the number of databases, the model of the database, among other factors, the canary deployment manager may calculate the complexity score for the client used by the entity.

In some embodiments, the canary deployment manager may scale the complexity score for the client used by the entity. In some embodiments, the canary deployment manager may scale the complexity score for one client based on the complexity scores of all the clients used by the entities. In some embodiments, the canary deployment manager may identify the highest complexity score from the complexity scores of all the clients used by the entities. Having identified highest complexity score, the canary deployment manager may scale each complexity score for each client used by the entity with the highest complexity score.

The canary deployment manager may determine a scale score (425). The canary deployment manager may determine the scale score for each entity based on a number of accounts associated with each entity. In some embodiments, the scale score may be indicative of a number of tenants for the application versions provided by the application provider. In some embodiments, the greater the number of tenants, the higher the scale score determined by the canary deployment manager may be. In contrast, the lesser the number of tenants, the lower the scale score determined by the canary deployment manager may be. The scale score may be any numerical value (e.g., ranging from 0 to 100, 0 to 10, 0 to 1, −100 to 100, −10 to 10, or −1 to 1, etc.) measuring the complexity of the database schema accessed by the client used by the entity. In some embodiments, the scale score may be particular to some version of the application executed on the client used by the entity. The scale score for one client used by one entity may be weighted or scaled by the scale scores of the other clients used by the respective entities.

To determine the scale score, the canary deployment manager may determine or identify any factors related to the number of accounts associated with each entity or the number of tenants for the applications provided by the application provider. In some embodiments, the canary deployment manager may identify the number of accounts associated with each entity. In some embodiments, the canary deployment manager may identify a number of account identifiers used by each entity. The account identifiers may be maintained at a user account database. The user account database may be a part of the canary deployment management device, a part of the application provider, or otherwise accessible to the canary deployment manager. In some embodiments, the canary deployment manager may access the user account database to identify the number of account identifiers to determine the number of accounts associated with each entity. In some embodiments, the canary deployment manager may identify the number of tenants for the application version provided to the entities. In some embodiments, the canary deployment manager may identify a number of tenant identifiers for the application version associated with the entities. The tenant identifiers may be maintained at the user account database. The canary deployment manager may access the user account database to identify the number of tenant identifiers to determine the number of tenants provided with the application versions by the application version. Based on the number of accounts associated with each entity and/or the number of tenants for the applications provided by the application provider, the canary deployment manager may calculate the scale score for the entity.

In some embodiments, the canary deployment manager may scale the scale score for the entity. In some embodiments, the canary deployment manager may scale the scale score for one entity on the scale scores of all the entities. In some embodiments, the canary deployment manager may identify the highest scale score from the scale scores of all the entities. Having identified highest scale score, the canary deployment manager may scale each scale score for each client used by the entity with the highest scale score.

The canary deployment manager may generate an aggregate canary score for deployment (430). With the input parameters for the canary score for each entity determined, the canary deployment manager may select subsets of the entities may to assign to canary waves of the plurality of canary deployments based on the overall canary score for each entity. Responsive to determining all the input parameters, the canary deployment manager may determine the overall canary score for each entity. To calculate the overall canary score, the canary deployment manager may calculate a combination value of the input parameters. The combination value may be a sum, an average, a weighted average, a function, or any other amalgamation of the input parameters.

The canary deployment manager may select a subset of entities to assign to a canary wave for deployment (435). Once the overall canary scores are calculated for all of the entities, the canary deployment manager may select the subsets of entities to assign to canary waves of the plurality of canary deployments. As described above, the plurality of canary deployments determined by the canary deployment manager may specify or may define a time (e.g., a specific time or time window) at which to provide the application version for each entity or client. The plurality of canary deployments may correspond to a canary wave. Each canary wave may identify or may include a set of entities or a set of client at the time at which to provide the application version. In some embodiments, the plurality of canary deployments may include a subset of entities identified in the request to deploy the update. In some embodiments, the plurality of canary deployments may include a subset of entities satisfying the one or more constraints specified in the request to deploy the update.

To select the subsets of entities to assign to canary waves, the canary deployment manager may select each entity of the subset for each canary wave based on the respective canary score relative to the canary scores other entities. In some embodiments, the canary deployment manager may select the entity for the subset in the canary wave based on the respective canary score the entity relative to predetermined threshold score. If the overall canary score is greater than or equal to the predetermined threshold score, the canary deployment manager may set the entity to the respective subset (e.g., a first canary wave). If the overall canary score is less than the predetermined threshold score, the canary deployment manager may set the entity to the other respective subset (e.g., a second canary wave).

The canary deployment manager may assign the entities to the respective canary waves based on the overall canary scores of each entity. In some embodiments, the canary deployment manager may select the entity for the subset in the canary wave based on the respective canary score the entity based on a canary wave mapping. The canary wave mapping may specify a range of overall canary scores for each canary wave of the plurality of canary deployments (e.g., 0 to 0.4 for a first canary wave, 0.4 to 0.9 for a second canary wave, and 0.9 to 1.0 for a third canary wave). The canary deployment manager may compare the overall canary score of each entity to the ranges specified in the canary wave mapping. Upon identifying a matching range, the canary deployment manager may assign the entity to the canary wave corresponding to the matching range of the canary wave mapping.

The canary deployment manager may deploy update to subset of entities in accordance with the canary wave assignments (440). With the entities assigned to canary waves of the plurality of canary deployments, the canary deployment manager may send, transmit, relay, or otherwise provide the application version to the entities in accordance with the plurality of canary deployments. The canary deployment manager may identify the application version from the request to deploy the update. In some embodiments, the canary deployment manager may identify a version identifier of the application to be provided in the request to deploy the update. The canary deployment manager may determine whether the version identifier of the application to be provided is different (e.g., earlier, older, later, more recent, or newer, etc.) than the version identifier the application previously provided. If the version identifier of the application to be provided does not differ from the version identifier of the application previously provided, the canary deployment manager may terminate provision of the application version to the entities.

On the other hand, if the version identifier of the application to be provided differs from the version identifier of the application previously provided, the canary deployment manager may proceed to provide the application version to the entities in accordance with the plurality of canary deployments. The canary deployment manager may retrieve, obtain, or otherwise receive the application version from the application provider. In some embodiments, the canary deployment manager may send a request for the application using the version identifier for the application version to the application provider. Subsequently, the canary deployment manager may receive the application version from the application provider. The canary deployment manager may in turn provide the application version in accordance with the plurality of canary deployments. In this fashion, the different, newer features and functionalities of the application version may be tested among a subset of entities with lower canary scores and thus less indicated performance issues or experiences, prior to rolling out the application to the remainder of the entities.

To distribute the application version in accordance with the plurality of canary deployments, the canary deployment manager may identify the entities specified in each canary deployment of the plurality of canary deployments. The canary deployment manager may further identify the times at which to provide the application to provide to the subset of entities specified in each canary deployment. The canary deployment manager may maintain a time to compare a current time to the time specified for each canary wave. Upon determining a match between the current and the time specified for each canary wave, the canary deployment manager may provide the application version to the subset of clients used by the associated subset of entities specified in the canary wave. In some embodiments, the canary deployment manager may otherwise make available the application version to the subset of entities specified in the canary wave. In some embodiments, the canary deployment manager may permit the account associated with the subset of entities to use the application version specified in the request to deploy the update. In some embodiments, the canary deployment manager may monitor network bandwidth usage of the network via which to provide the application. By measuring the network bandwidth usage, the canary deployment manager may control distribution of the application version.

During the provisioning of the application version, the canary deployment manager may receive a request to stop the deployment of the update. The request to stop the deployment may be from the application provider or another associated device. In some embodiments, the request to stop the deployment of the update may be received by the canary deployment manager, in response to a detection of an adverse experience of the application version indicated by the subset of entities from at least one of the canary deployments. Upon receipt of the request to stop the deployment, the canary deployment manager may halt or terminate the provisioning of the application version to the entities for the subsequent canary waves in the plurality of canary deployments. In some embodiments, the canary deployment manager may also identify the application version previously provided to the entities. The canary deployment manager may then provide the application version previously provided to the one or more subsets of entities that were provided with the subsequent application version. In this manner, the canary deployment management device may prevent adverse impact and experience from affecting all the entities using the applications provided by the application provider.

In some embodiments, the canary deployment manager may continue to keep track of the overall canary scores for each entity that were provided with the application version. The canary deployment manager may compare the overall canary scores for each entity to a predetermined threshold. The canary deployment manager may identify a number of the entities with overall canary scores greater than or equal to the predetermined threshold. The canary deployment manager may compare the number of entities to a predetermined threshold number. If the number of entities is greater than or equal to the predetermined threshold number, the canary deployment manager may halt or terminate the provisioning of the application version to the entities for the subsequent canary waves in the plurality of canary deployments. In some embodiments, the canary deployment manager may then provide the application version previously provided to the one or more subsets of entities that were provided with the subsequent application version. In this manner, the canary deployment management device may automatically prevent adverse impact and experience from affecting all the entities using the applications provided by the application provider, without the request to stop the deployment update from the application provider.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A system for deploying updates to multiple entities, comprising:
a device including a canary deployment manager, the canary deployment manager configured to:
receive a request to deploy an update in a plurality of canary deployments;
determine, for each entity of a plurality of entities, a support score based on support issues experienced by each entity;
determine, for each entity of the plurality of entities, a monitoring score based on at least one performance or availability issue experienced by each entity;
generate, for each entity of the plurality of entities, based on the support score of each entity and the monitoring score of each entity, a canary score used to identify a canary deployment to which to assign each entity; and
select a subset of the plurality of entities to assign to a first canary wave of the plurality of canary deployments based on the respective canary scores of each of the subset of entities.

2. The system of claim 1, wherein the canary deployment manager is configured to determine, for each entity, a number of customer support issues logged by the entity or a severity level of the customer support issues logged by the entity; and
wherein to determine, for each entity of a plurality of entities, the support score based on support issues experienced by each entity, the canary deployment manager is configured to determine, for each entity, the support score based on the number of customer support issues logged by the entity or the severity level of the customer support issues logged by the entity.

3. The system of claim 1, wherein the canary deployment manager is configured to determine, for each entity, a length of time since the support issue was experienced by each entity; and
wherein to determine, for each entity of a plurality of entities, the support score based on support issues experienced by each entity, the canary deployment manager is configured to determine, for each entity, the support score based on the length of the time since the support issue was experienced by each entity.

4. The system of claim 1, wherein the canary deployment manager is configured to determine, for each entity, a number of performance degradation issues experienced by the entity that are monitored by the device or a severity level of the performance degradation issues experienced by the entity that are monitored by the device; and
wherein to determine, for each entity of the plurality of entities, the monitoring score based on the at least one performance or availability issue experienced by each entity, the canary deployment manager is configured to determine, for each entity, the monitoring score based on the number of performance degradation issues experienced by the entity that are monitored by the device or the severity level of the performance degradation issues experienced by the entity that are monitored by the device.

5. The system of claim 1, wherein the canary deployment manager is configured to determine, for each entity, a length of time since the at least one performance or availability issue was experienced by each entity; and
wherein to determine, by the device, for each entity of the plurality of entities, the monitoring score based on the at least one performance or availability issue experienced by each entity, the canary deployment manager is configured to determine, for each entity, the monitoring score based on the length of the time since the at least one performance or availability issue was experienced by each entity.

6. The system of claim 1, wherein the canary deployment manager is configured to determine, for each entity of a plurality of entities, a complexity score determined based on a complexity of a schema or environment of each entity; and
wherein to generate, for each entity, the canary score, the canary deployment manager is configured to generate the canary score of each entity based on the complexity score of each entity.

7. The system of claim 6, wherein the canary deployment manager is configured to determine, for each entity of a plurality of entities, a scale score determined based on a number of accounts managed by each entity; and wherein to generate, for each entity, the canary score, the canary deployment manager is configured to generate the canary score of each entity based on the scale score of each entity.

8. The system of claim 1, wherein to determine, for each entity of the plurality of entities, the monitoring score based on at least one performance or availability issue experienced by each entity, a monitor of the device is configured to record the at least one performance or availability issue experienced by each entity.

9. The system of claim 1, wherein to select a subset of the plurality of entities to assign to a first canary deployment of the plurality of canary deployments based on the respective canary scores of each of the subset of entities, the canary deployment manager is configured to select each entity of the subset based on i) the respective canary score of each entity relative to a predetermined threshold score or ii) the respective canary score of each entity relative to respective canary scores of a remainder of the plurality of entities.

10. The system of claim 1, wherein the subset of the plurality of entities to assign to a first canary deployment of the plurality of canary deployments is a first subset; and wherein the canary deployment manager is configured to select a second subset of the plurality of entities to assign to a second canary deployment of the plurality of canary deployments based on the respective canary scores of each of the second subset of entities.

11. A method for deploying updates to multiple entities, comprising:
receiving, by a device, a request to deploy an update in a plurality of canary deployments;
determining, by the device, for each entity of a plurality of entities, a support score based on support issues experienced by each entity;
determining, by the device, for each entity of the plurality of entities, a monitoring score based on at least one performance or availability issue experienced by each entity;
generating, by the device, for each entity of the plurality of entities, based on the support score of each entity and the monitoring score of each entity, a canary score used to identify a canary deployment to which to assign each entity; and
selecting, by the device, a subset of the plurality of entities to assign to a first canary deployment of the plurality of canary deployments based on the respective canary scores of each of the subset of entities.

12. The method of claim 11, comprises determining, by the device, for each entity, a number of customer support issues logged by the entity or a severity level of the customer support issues logged by the entity; and wherein determining, for each entity of a plurality of entities, the support score based on support issues experienced by each entity comprises determining, for each entity, the support score based on the number of customer support issues logged by the entity or the severity level of the customer support issues logged by the entity.

13. The method of claim 11, comprises determining, by the device, for each entity, a length of time since the support issue was experienced by each entity; and wherein determining, for each entity of a plurality of entities, the support score based on support issues experienced by each entity comprises determining, for each entity, the support score based on the length of the time since the support issue was experienced by each entity.

14. The method of claim 11, comprises determining, by the device, for each entity, a number of performance degradation issues experienced by the entity that are monitored by the device or a severity level of the performance degradation issues experienced by the entity that are monitored by the device; and wherein determining, by the device, for each entity of the plurality of entities, the monitoring score based on the at least one performance or availability issue experienced by each entity comprises determining, for each entity, the monitoring score based on the number of performance degradation issues experienced by the entity that are monitored by the device or the severity level of the performance degradation issues experienced by the entity that are monitored by the device.

15. The method of claim 11, comprising determining, by the device, for each entity, a length of time since the at least one performance or availability issue was experienced by each entity; and wherein determining, for each entity of the plurality of entities, the monitoring score based on the at least one performance or availability issue experienced by each entity comprises determining, for each entity, the monitoring score based on the length of the time since the at least one performance or availability issue was experienced by each entity.

16. The method of claim 11, comprising determining, by the device, for each entity of a plurality of entities, a complexity score determined based on a complexity of a schema or environment of each entity; and wherein generating, for each entity, the canary score comprises generating the canary score of each entity based on the complexity score of each entity.

17. The method of claim 11, comprising determining, by the device, for each entity of a plurality of entities, a scale score determined based on a number of accounts managed by each entity; and wherein generating, for each entity, the canary score comprises generating the canary score of each entity based on the scale score of each entity.

18. The method of claim 11, wherein determining, for each entity of the plurality of entities, the monitoring score based on at least one performance or availability issue experienced by each entity comprises recording, by a monitor of the device, the at least one performance or availability issue experienced by each entity.

19. The method of claim 11, wherein selecting, by the device, a subset of the plurality of entities to assign to a first canary deployment of the plurality of canary deployments based on the respective canary scores of each of the subset of entities comprises selecting, by the device, each entity of the subset based on i) the respective canary score of each entity relative to a predetermined threshold score or ii) the respective canary score of each entity relative to respective canary scores of a remainder of the plurality of entities.

20. The method of claim 11, wherein the subset of the plurality of entities to assign to a first canary deployment of the plurality of canary deployments is a first subset; and further comprising selecting, by the device, a second subset of the plurality of entities to assign to a second canary deployment of the plurality of canary deployments based on the respective canary scores of each of the second subset of entities.

* * * * *